US012713466B2

(12) United States Patent
Prasad et al.

(10) Patent No.: US 12,713,466 B2
(45) Date of Patent: Aug. 18, 2026

(54) RANDOM ACCESS PROCEDURES WITH PREAMBLE REPETITIONS

(71) Applicant: Comcast Cable Communications, LLC, Philadelphia, PA (US)

(72) Inventors: Gautham Prasad, Herndon, VA (US); Ali Cagatay Cirik, Chantilly, VA (US); Esmael Hejazi Dinan, McLean, VA (US); Hyoungsuk Jeon, Centreville, VA (US); Hua Zhou, Vienna, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 298 days.

(21) Appl. No.: 18/400,837

(22) Filed: Dec. 29, 2023

(65) Prior Publication Data

US 2024/0224336 A1 Jul. 4, 2024

Related U.S. Application Data

(60) Provisional application No. 63/436,234, filed on Dec. 30, 2022.

(51) Int. Cl.
*H04W 74/0833* (2024.01)
*H04L 5/00* (2006.01)
(Continued)

(52) U.S. Cl.
CPC ....... *H04W 74/0833* (2013.01); *H04L 5/0051* (2013.01); *H04W 52/36* (2013.01); *H04W 76/20* (2018.02)

(58) Field of Classification Search
CPC . H04W 74/0833; H04W 52/36; H04W 76/20; H04W 52/48; H04W 52/50; H04L 5/0051; H04L 1/08
See application file for complete search history.

(56) References Cited

U.S. PATENT DOCUMENTS 11,924,768 B2 * 3/2024 Xing .................... H04L 5/0044
2019/0239087 A1 * 8/2019 Hwang .................... H04L 1/08
(Continued)

FOREIGN PATENT DOCUMENTS

CN 111757541 A 10/2020
EP 3866371 A1 8/2021

OTHER PUBLICATIONS

3GPP TS 36.321 V17.2.0 (Sep. 2022), Technical Specification, 3rd Generation Partnership Project; Technical Specification Group Radio Access Network; Evolved Universal Terrestrial Radio Access (E-UTRA); Medium Access Control (MAC) protocol specification (Release 17).
(Continued)

*Primary Examiner* — Ivan O Latorre
(74) *Attorney, Agent, or Firm* — Banner & Witcoff, Ltd.

(57) ABSTRACT

A wireless device may initiate communications with a base station using one or more random access procedures. Different random access procedures may be associated with a different quantity of preamble repetitions and/or different reference signals. Based on a determination that a random access response has not been received in response to a first quantity of preamble repetitions, the wireless device may perform a second quantity of preamble repetitions using a transmission power that is increased based on at least one of: the first quantity of preamble repetitions and the second quantity of preamble repetitions being the same, or a first reference signal (e.g., associated with the first quantity of preamble repetitions) being the same as a second reference signal (e.g., associated with the second quantity of preamble repetitions).

21 Claims, 21 Drawing Sheets

(51) Int. Cl.
*H04W 52/36* (2009.01)
*H04W 76/20* (2018.01)

(56) References Cited

U.S. PATENT DOCUMENTS

| | | | | |
|---|---|---|---|---|
| 2020/0084730 | A1* | 3/2020 | Ji | H04W 52/54 |
| 2020/0212987 | A1 | 7/2020 | Priyanto et al. | |
| 2021/0227593 | A1* | 7/2021 | Chen | H04L 5/0048 |
| 2022/0046552 | A1* | 2/2022 | Xu | H04W 52/245 |
| 2022/0256612 | A1* | 8/2022 | MolavianJazi | H04L 1/189 |
| 2022/0322443 | A1* | 10/2022 | Kwak | H04W 74/0836 |
| 2024/0224336 | A1* | 7/2024 | Prasad | H04W 74/0833 |

OTHER PUBLICATIONS

3GPP TS 36.331 V17.2.0 (Sep. 2022), Technical Specification, 3rd Generation Partnership Project; Technical Specification Group Radio Access Network; Evolved Universal Terrestrial Radio Access (E-UTRA); Radio Resource Control (RRC); Protocol specification (Release 17).

3GPP TS 38.133 V17.7.0 (Sep. 2022), 3rd Generation Partnership Project; Technical Specification Group Radio Access Network; NR; Requirements for support of radio resource management (Release 17).

3GPP TS 38.213 V17.4.0 (Dec. 2022), 3rd Generation Partnership Project; Technical Specification Group Radio Access Network; NR; Physical layer procedures for control (Release 17).

3GPP TS 38.321 V17.3.0 (Dec. 2022), 3rd Generation Partnership Project; Technical Specification Group Radio Access Network; NR; Medium Access Control (MAC) protocol specification (Release 17).

3GPP TS 38.331 V17.3.0 (Dec. 2022), 3rd Generation Partnership Project; Technical Specification Group Radio Access Network; NR; Radio Resource Control (RRC) protocol specification (Release 17).

R1-220xxxx 3GPP TSG RAN WG1 Meeting #110-e, Toulouse, Aug. 22-26, 2022, Source: MCC Support, Title: Draft Report of 3GPP TSG RAN WG1 #109-e v0.3.0 (Online meeting, May 9-20, 2022).

R1-2208321 3GPP TSG RAN WG1 Meeting #110bis-e, Online, Oct. 10-19, 2022, Source: MCC Support, Title: Final Report of 3GPP TSG RAN WG1 #110 v1.0.0 (Toulouse, France, Aug. 22-26, 2022).

R1-2210801 3GPP TSG RAN WG1 Meeting #111, Toulouse, France, Nov. 14-18, 2022, Source: MCC Support, Title: Final Report of 3GPP TSG RAN WG1 #110bis-e v1.0.0 (Online, Oct. 10-19, 2022).

R1-2208846 3GPP TSG RAN WG1 #110bis-e, e-Meeting, Oct. 10-19, 2022, Source: OPPO, Title: PRACH coverage enhancements.

R1-2209363 3GPP TSG RAN WG1 #110bis-e, e-Meeting, Oct. 10-19, 2022, Source: CMCC, Title: Discussion on PRACH coverage enhancements.

R1-2210600 3GPP TSG RAN WG1 #110bis-e, e-Meeting, Oct. 10-19, 2022, Source: Moderator (CMCC), Title: Summary#5 on evaluation on NR duplex evolution.

R1-2210879 3GPP TSG-RAN WG1 Meeting #111, Toulouse, France, Nov. 14-18, 2022, Source: Huawei, HiSilicon, Title: Discussion on PRACH coverage enhancements.

R1-2211185 3GPP TSG-RAN WG1 Meeting #111, Toulouse, France, Nov. 14-18, 2022, Source: CATT, Title: PRACH coverage enhancements.

R1-2211474 3GPP TSG-RAN WG1 Meeting #111, Toulouse, France, Nov. 14-18, 2022, Source: OPPO, Title: PRACH coverage enhancements.

R2-161734 3GPP TSG-RAN WG2 #93, St. Julian's, Malta, Feb. 15-19, 2016, Source: Ericsson [rapporteur], Title: Email discussion report on [92#44][LTE/MTC] MAC Open Items.

R2-161771 3GPP TSG-RAN WG2 #93, St. Julian's, Malta, Feb. 15-19, 2016, Source: Session Chairman (LG Electronics), Title: Report of the LTE UP session.

R2-2210600 3GPP TSG-RAN WG2 Meeting #119bis electronic, Online, Oct. 10-19, 2022, Source: LG Electronics Inc., Title: Discussion on Scheduling enahancement for XR.

RP-221858 3GPP TSG RAN Meeting #96, Budapest, Hungary, Jun. 6-9, 2022, Source: China Telecom, Title: Revised WID on Further NR coverage enhancements.

May 24, 2024—EP Search Report—EP App. No. 23220819.9.

* cited by examiner

Logical Channels

Transport Channels

Physical Channels

Physical Signals

PCCH
BCCH
CCCH
DCCH
DTCH

PCH
BCH
DL-SCH

DCI

PBCH
PDSCH
PDCCH

PSS/ SSS
CSI-RS
DM-RS
PT-RS

Downlink

CCCH
DCCH
DTCH

UL-SCH
RACH

UCI

PUSCH
PUCCH
PRACH

DM-RS
PT-RS
SRS

Uplink

RANDOM ACCESS PROCEDURES WITH PREAMBLE REPETITIONS

CROSS-REFERENCE TO RELATED APPLICATIONS

This application claims the benefit of U.S. Provisional Application No. 63/436,234 filed on Dec. 30, 2022. The above-referenced application is hereby incorporated by reference in its entirety.

BACKGROUND

A wireless device initiates wireless communication with a base station using a random access procedure. The wireless device transmits a preamble to the base station. If a random access response is not received from the base station, the wireless device performs a preamble retransmission.

SUMMARY

The following summary presents a simplified summary of certain features. The summary is not an extensive overview and is not intended to identify key or critical elements.

A wireless device may communicate with a base station. A random access procedure may be used to initiate the communications. The random access procedure may comprise the wireless device performing an initial preamble transmission using a first transmission power. The wireless device may perform preamble re-transmission using a second (e.g., ramped) transmission power, for example, if a response to the initial preamble transmission is not received from the base station. Multiple random access procedures may be performed, such as for coverage enhancement, whereby each random access procedure may comprise preamble re-transmissions. To avoid unnecessarily increasing transmission power for preamble transmission based on an unsuccessful initial preamble transmission, the wireless device may use transmission power ramping that is based on a quantity of preamble repetitions (e.g., being the same as another quantity), whereby a different quantity of preamble repetitions may be used for different reference signals associated with a respective random access procedure. Additionally, or alternatively, the wireless device may use transmission power ramping that is based on both a quantity of preamble repetitions being the same and a reference signal being the same, whereby different random access procedures may be associated with different reference signals. These and other features and advantages are described in greater detail below.

BRIEF DESCRIPTION OF THE DRAWINGS

Examples of several of the various embodiments of the present disclosure are described herein with reference to the drawings.

DETAILED DESCRIPTION

Figure 1A:
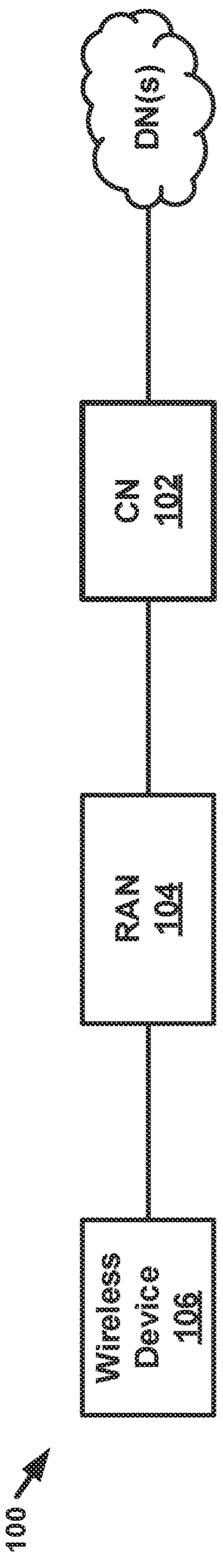
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNS (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IOT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

Figure 1B:
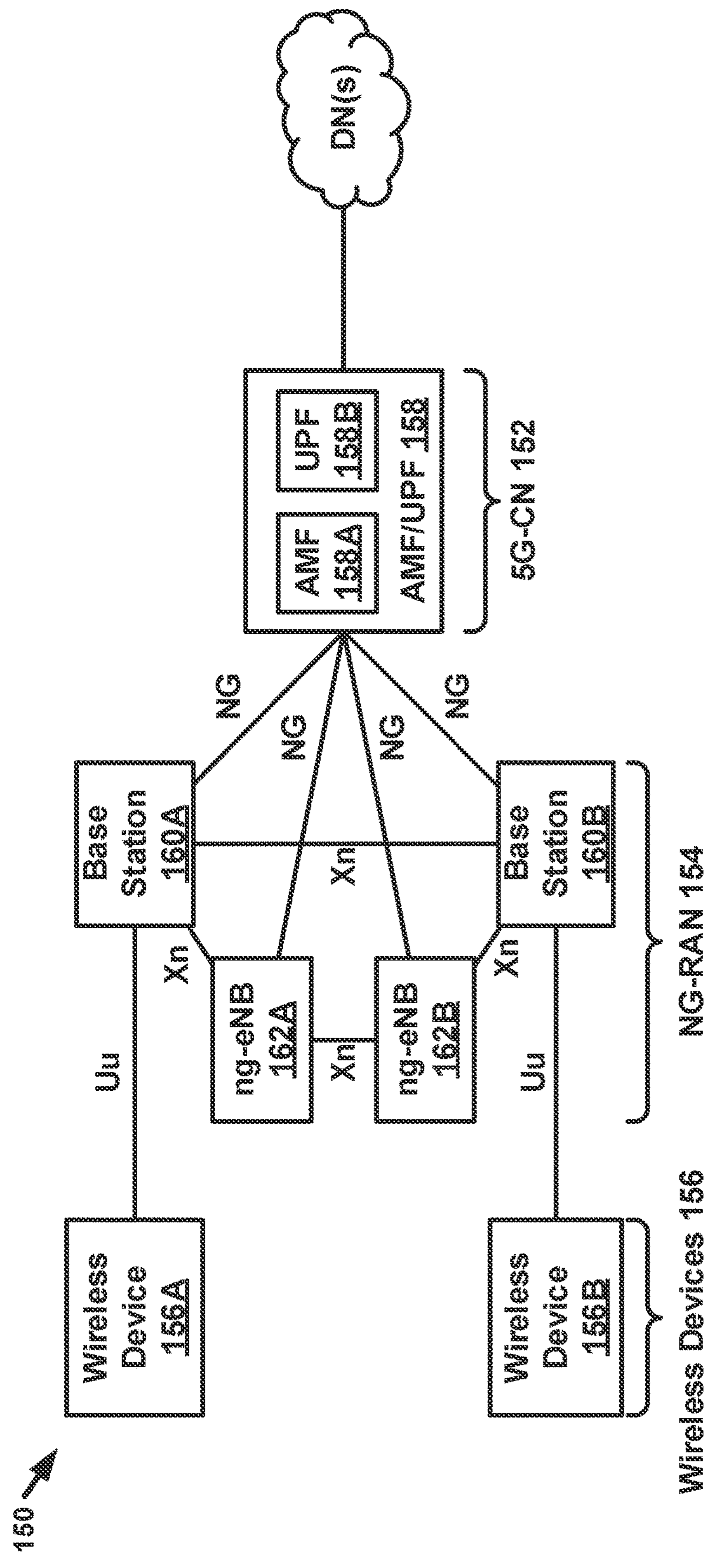

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNS (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QOS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng cNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-cNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IOT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
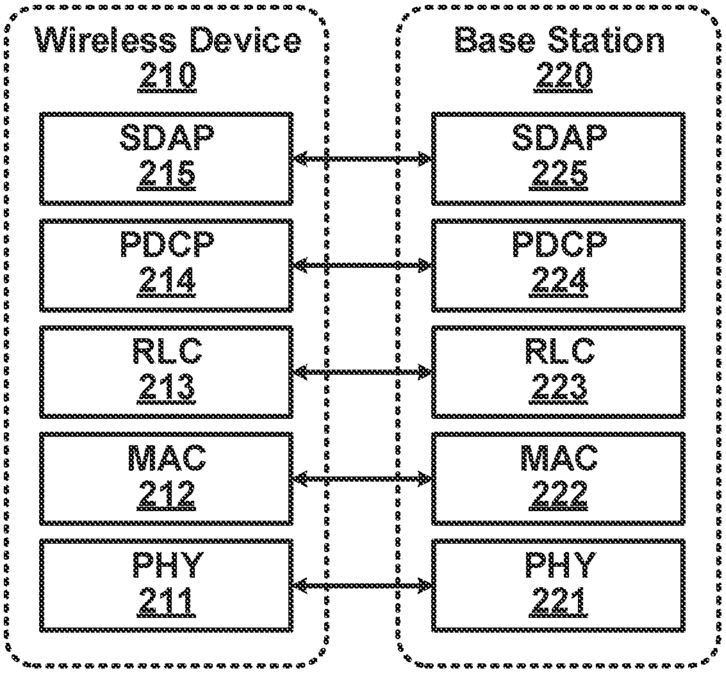
FIG. 2A shows an example user plane.
Figure 2B:
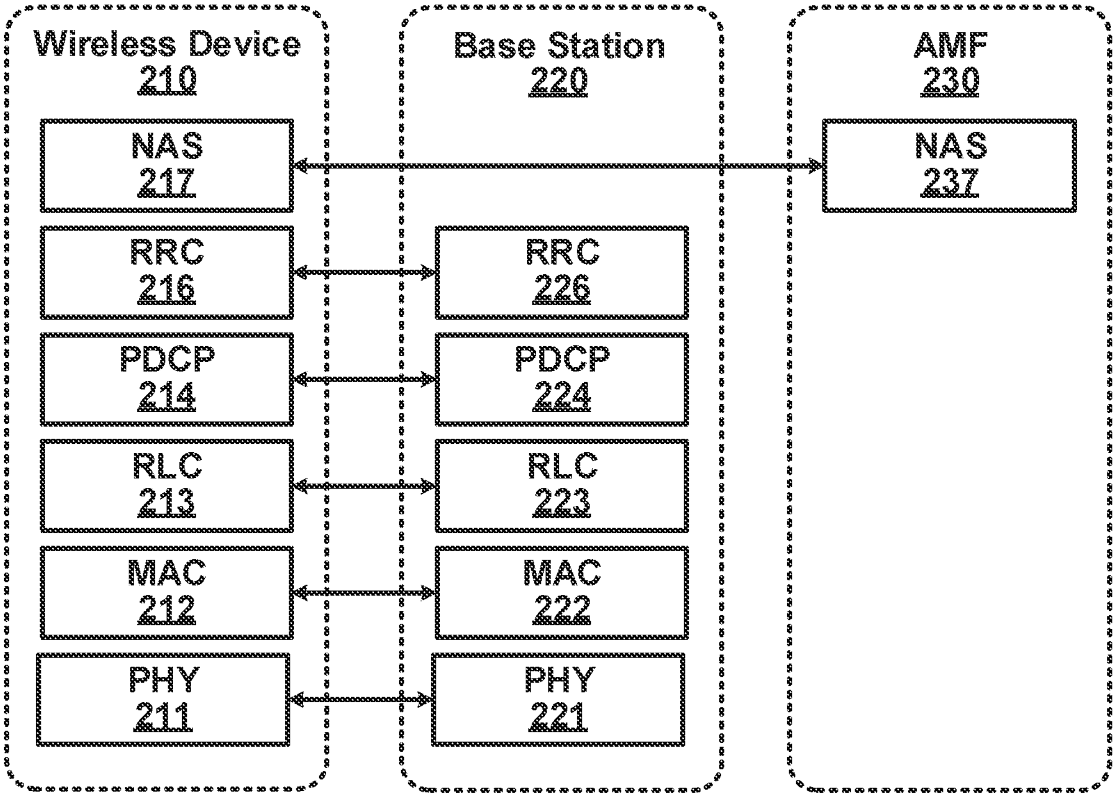
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
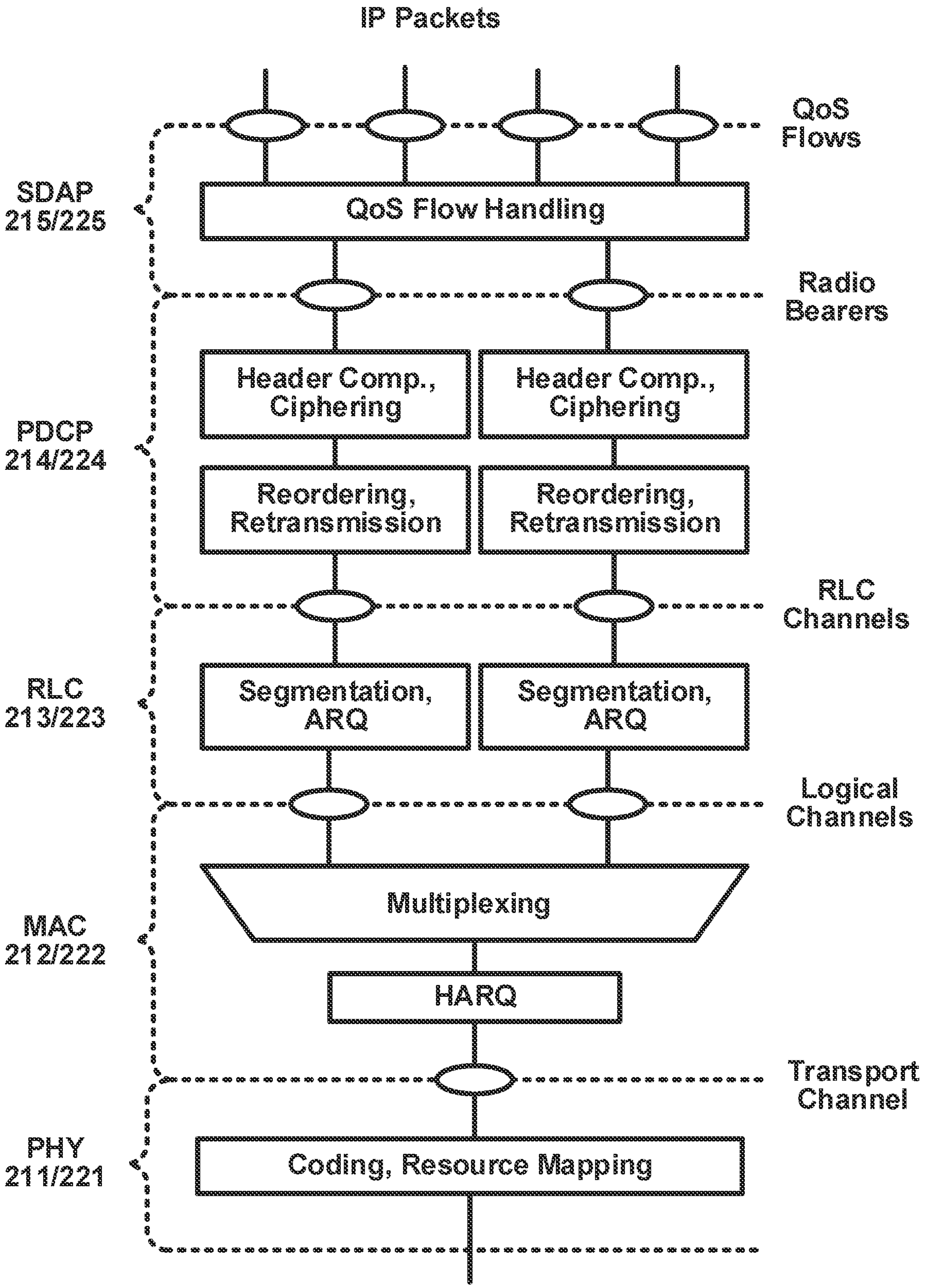
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QOS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a Qos flow indicator be (QFI), which may monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted (e.g., sent) over the air interface, ciphering/deciphering to prevent unauthorized decoding of data transmitted (e.g., sent) over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity example/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figure 4A:
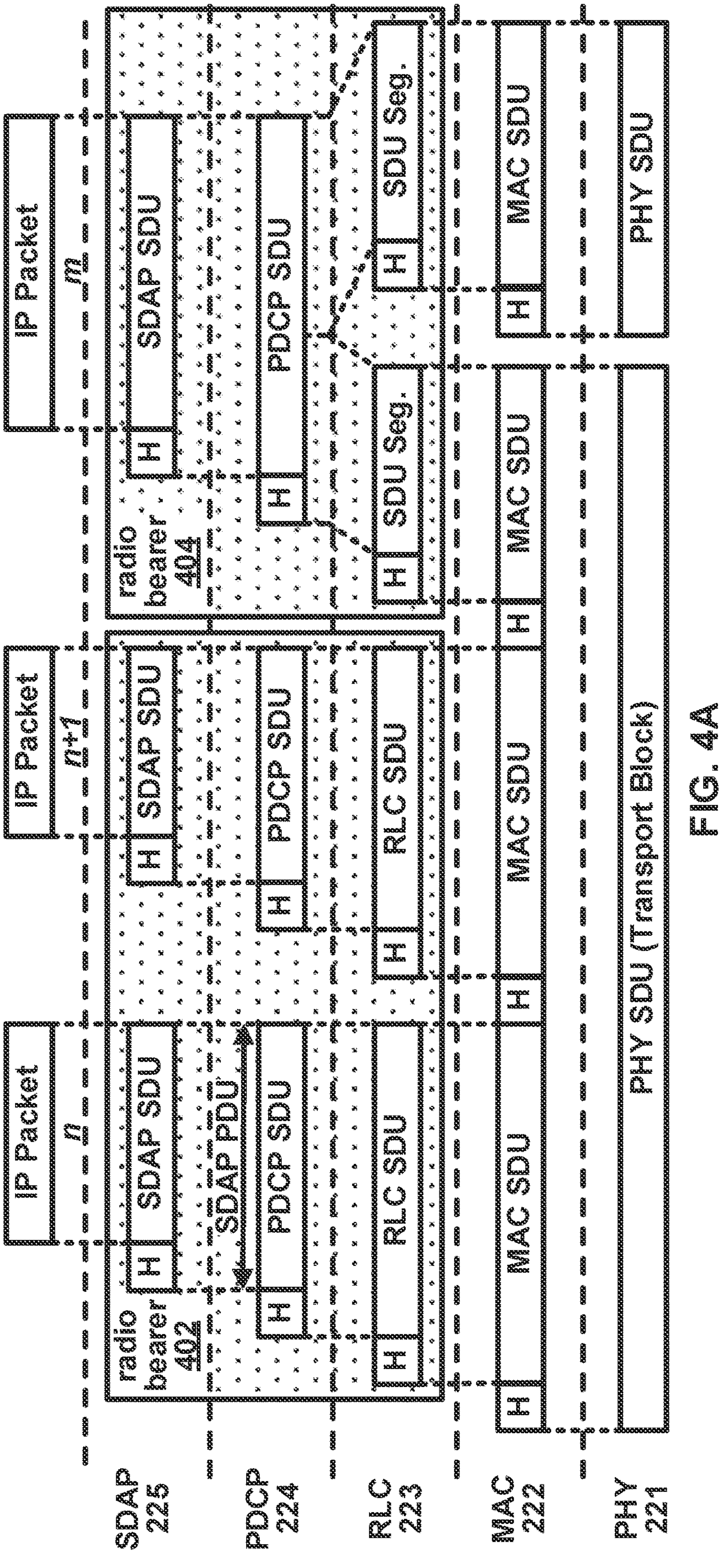
FIG. 4A shows an example downlink data flow for a user plane configuration.

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a quantity/number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

Figure 4B:
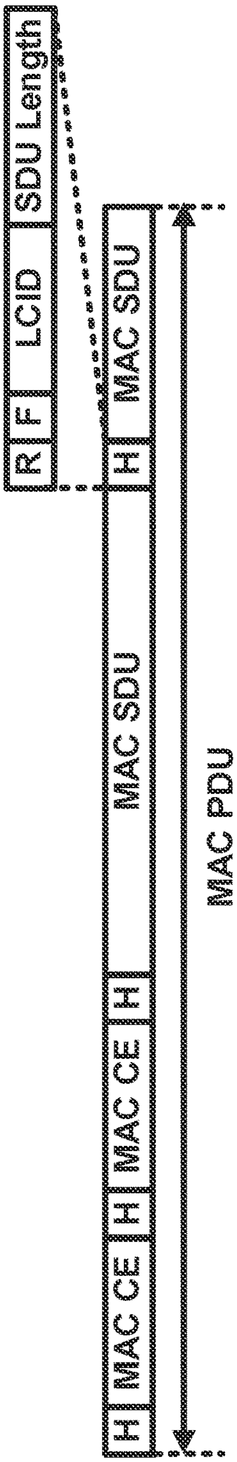
FIG. 4B shows an example format of a Medium Access Control (MAC) subheader in a MAC Protocol Data Unit (PDU).

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figures 5A, 5B:
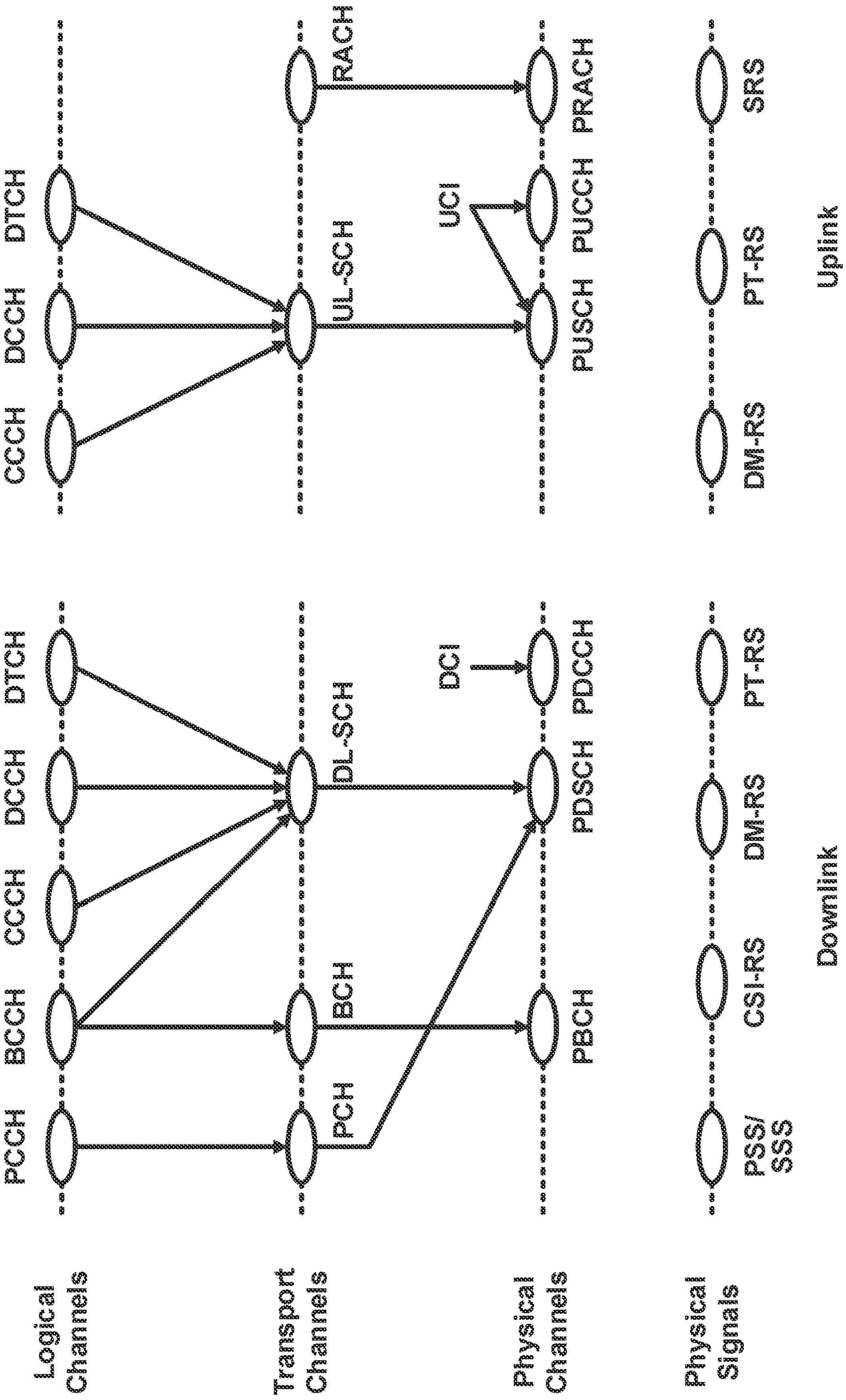
FIG. 5A shows an example mapping for downlink channels.
FIG. 5B shows an example mapping for uplink channels.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
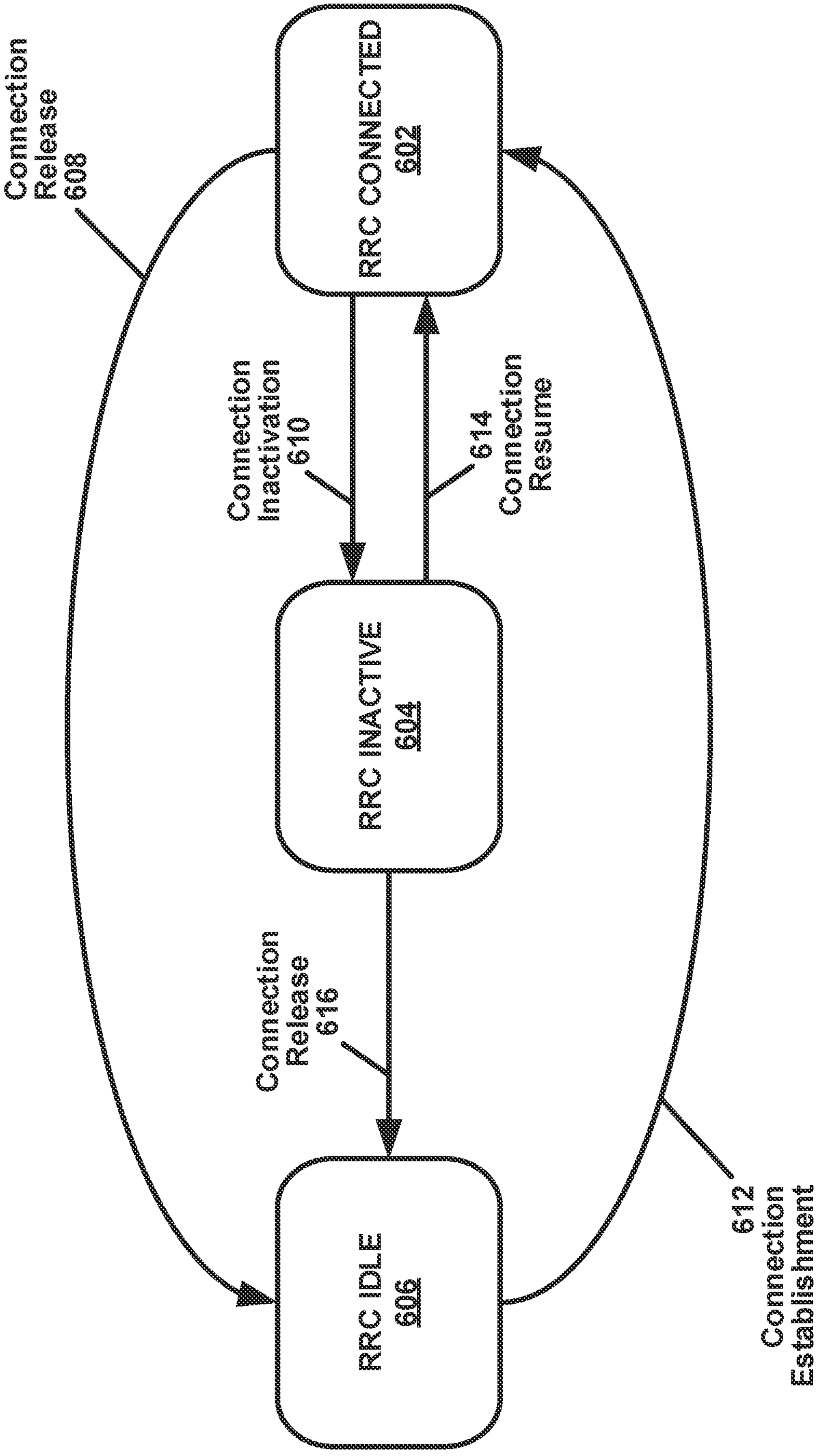
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by a RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN arca identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
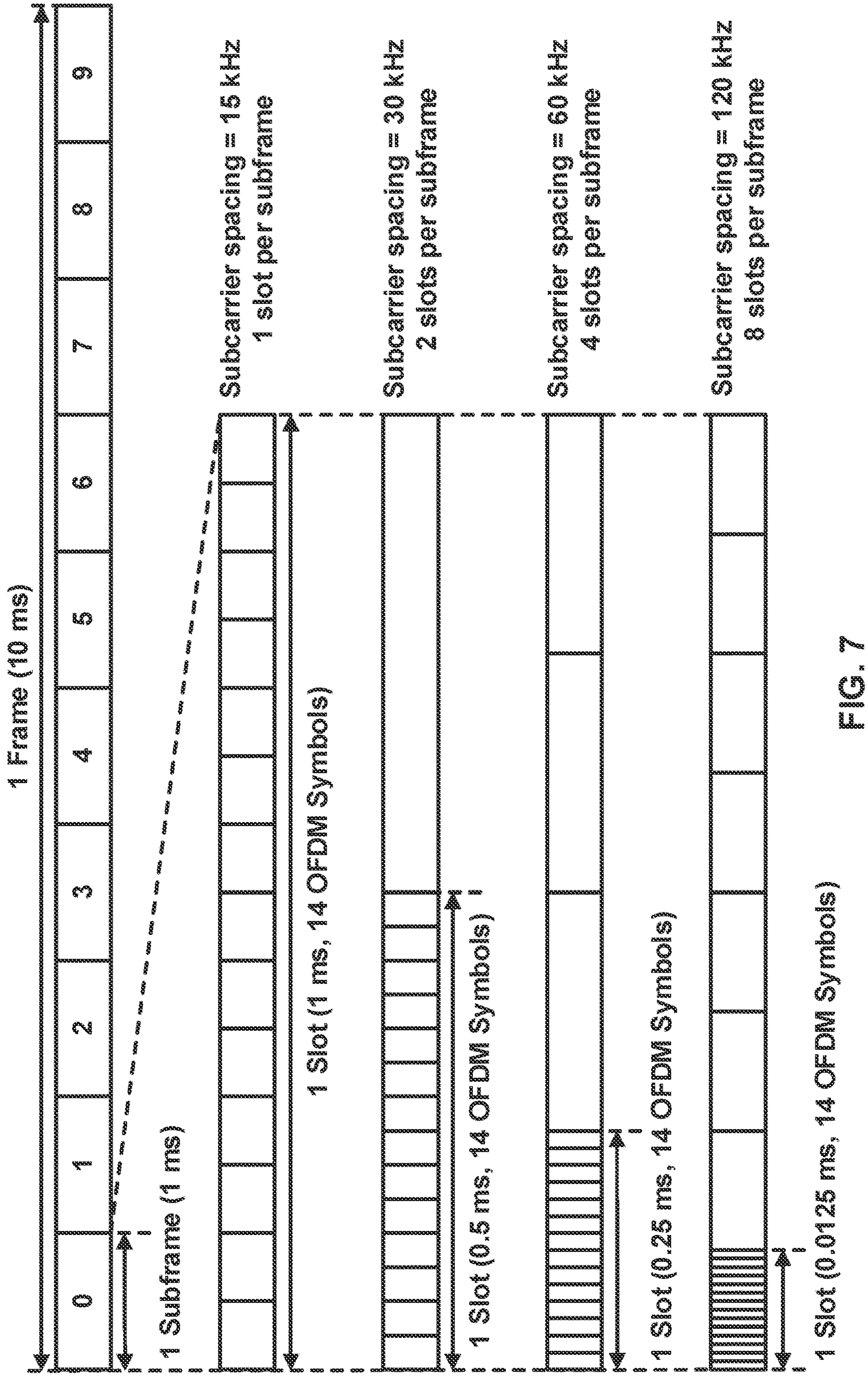
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame quantity/number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 μs, for example, for a numerology in an NR configuration or any other radio configurations. Numerologies may be defined with the following subcarrier spacing/cyclic prefix duration combinations: 15 kHz/4.7 μs; 30 kHz/2.3 μs; 60 kHz/1.2 μs; 120 kHz/0.59 μs; 240 kHz/0.29 μs, and/or any other subcarrier spacing/cyclic prefix duration combinations.

A slot may have a fixed quantity/number of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
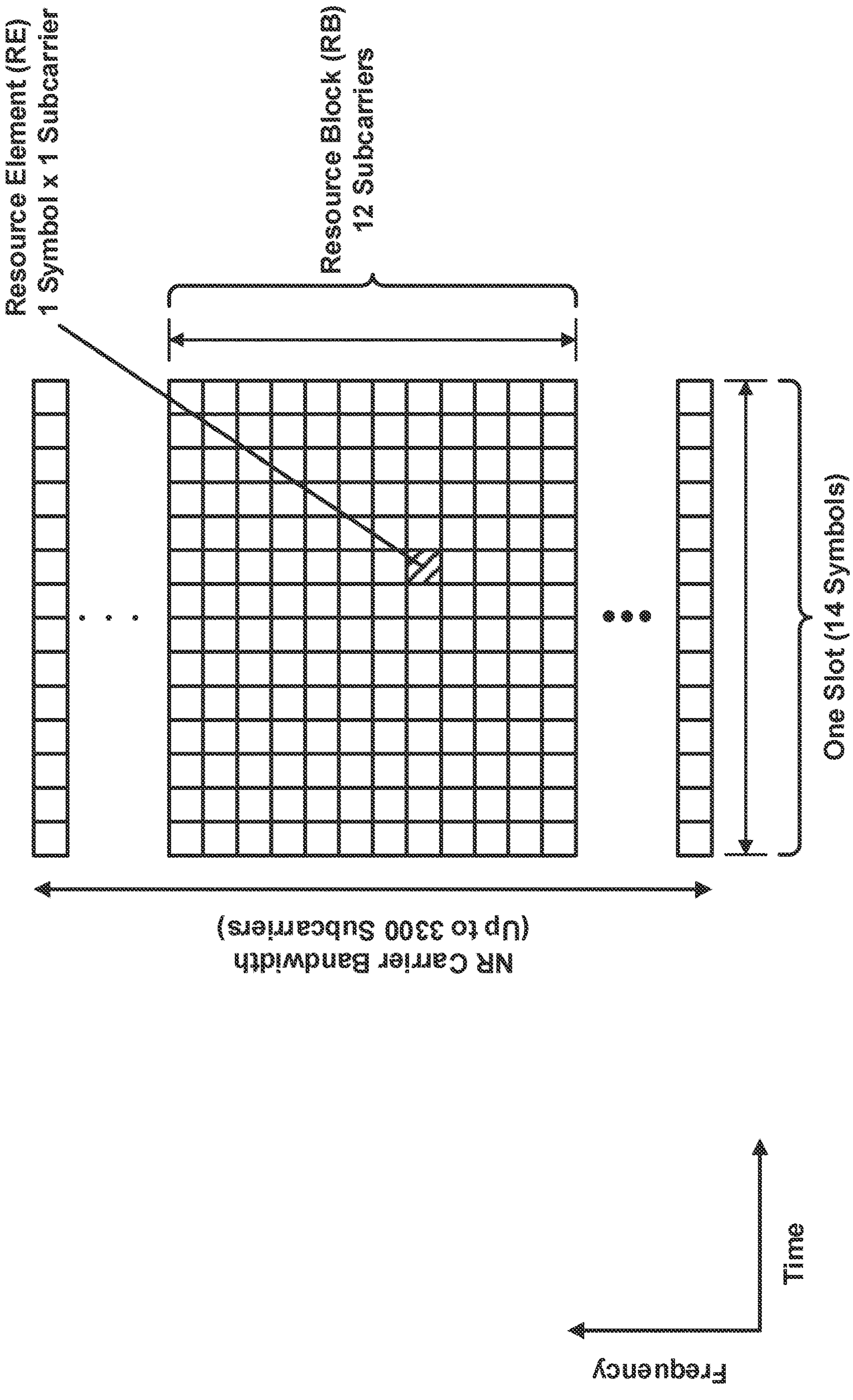
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). A RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, based on (e.g., after or in response to) receiving DCI indicating the second BWP as an active BWP. A wireless device may switch an active BWP from a first BWP to a second BWP, for example, based on (e.g., after or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
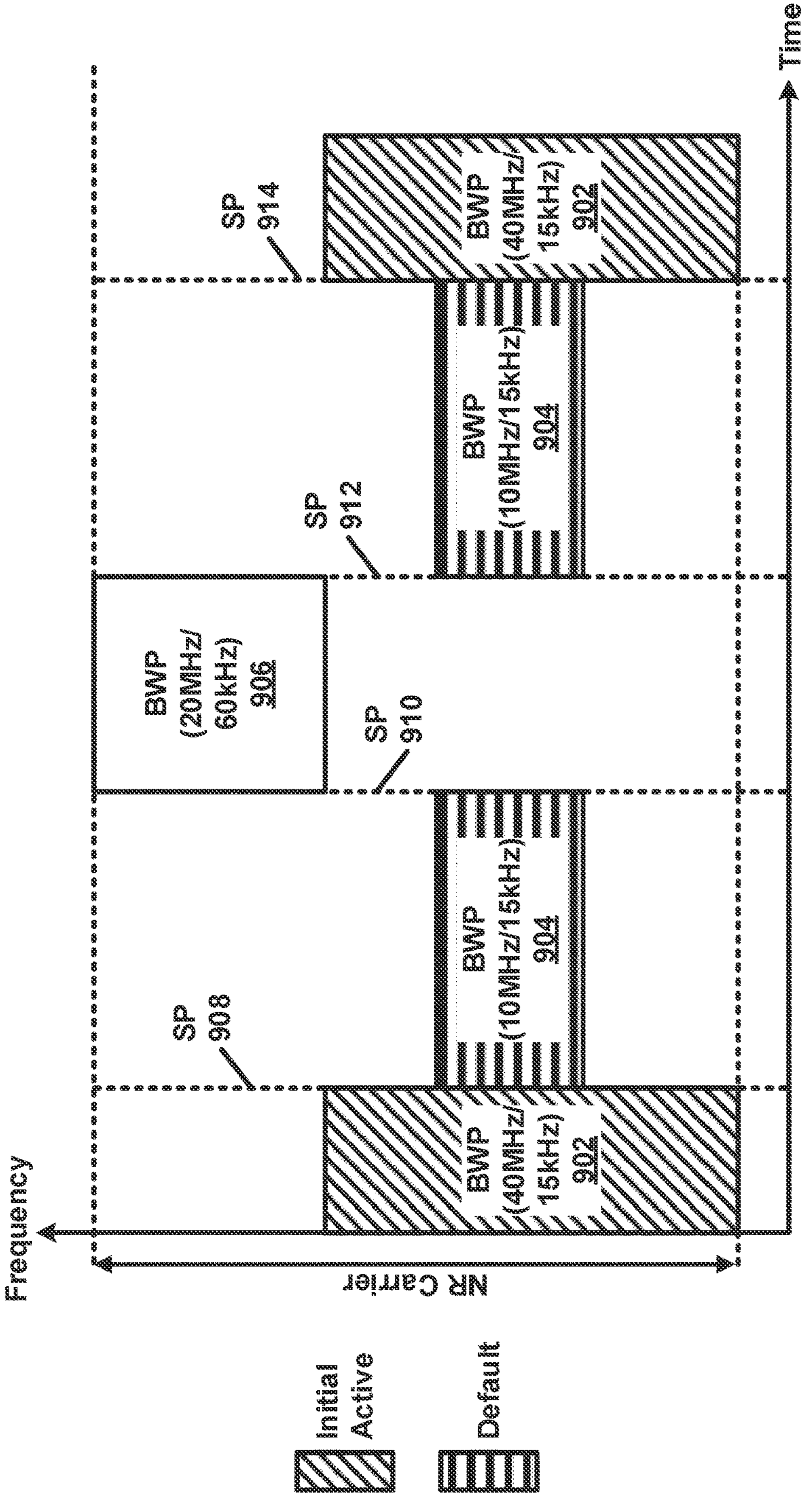
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, based on (e.g., after or in response to) an expiry of a BWP inactivity timer (e.g., indicating switching to the default BWP). The switching at the switching point 908 may occur, for example, based on (e.g., after or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, a based on (e.g., after or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a quantity/number of serving cells for the wireless device (e.g., one serving cell for a CC), for example, if CA is configured/used. The CCs may have multiple configurations in the frequency domain.

Figure 10A:
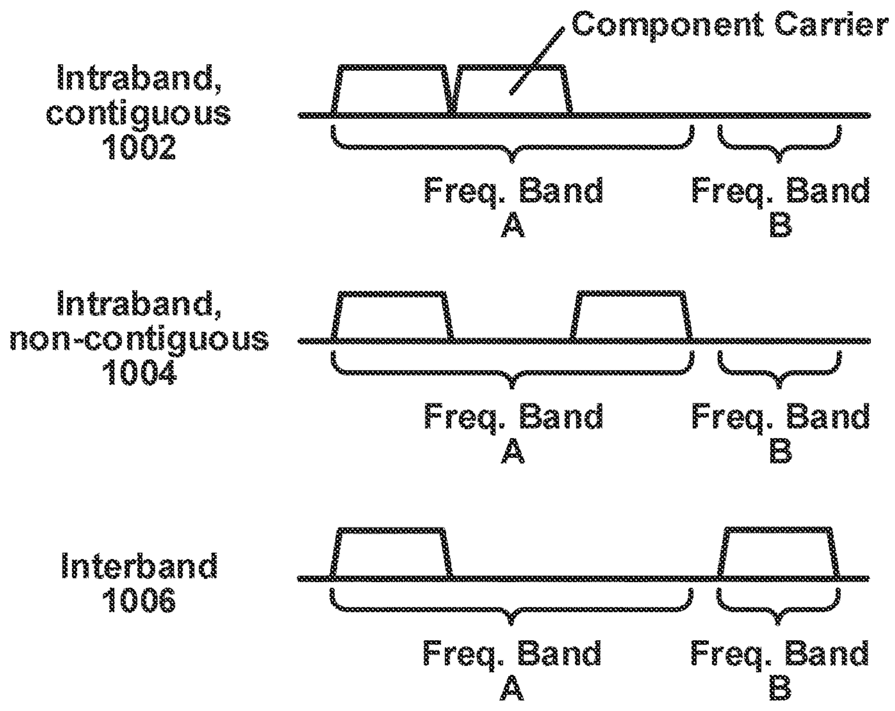
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, based on (e.g., after or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger quantity/number of aggregated downlink CCs, the PUCCH of the PCell may become overloaded. Cells may be divided into multiple PUCCH groups.

Figure 10B:
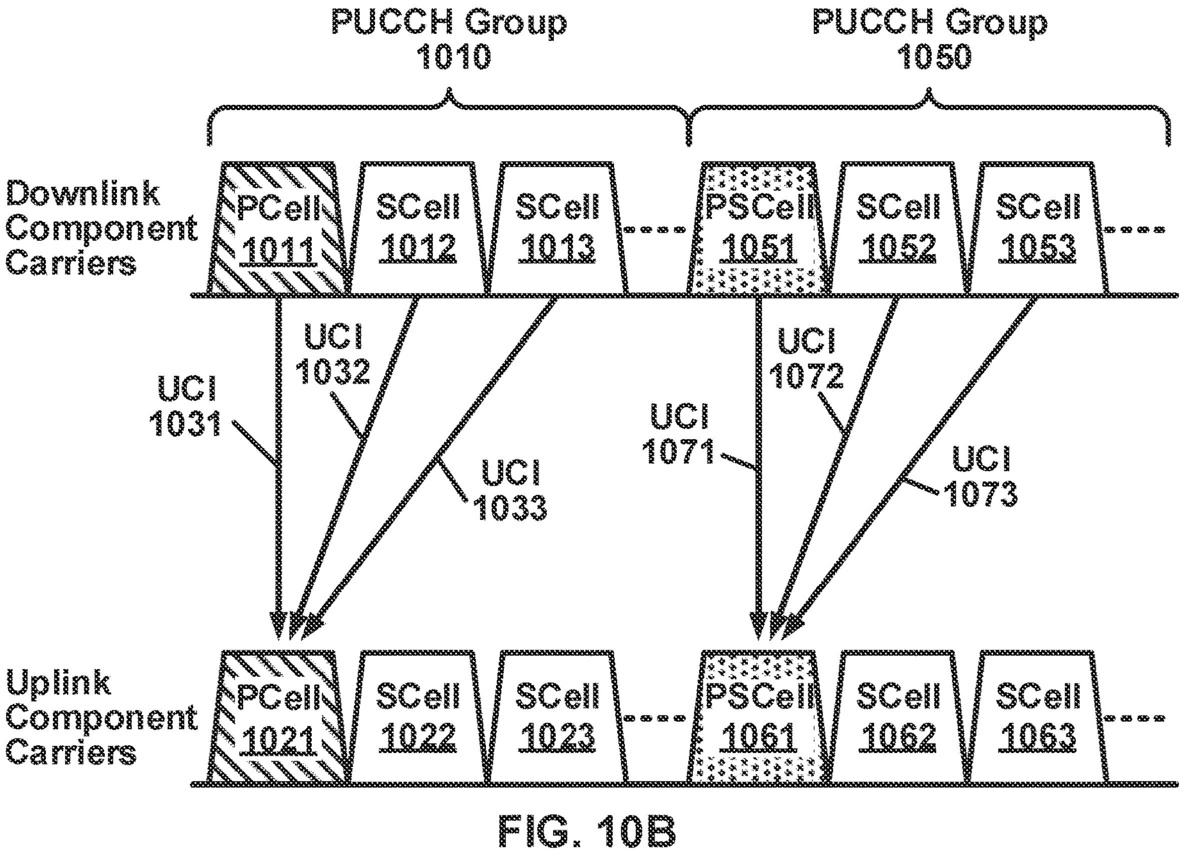
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
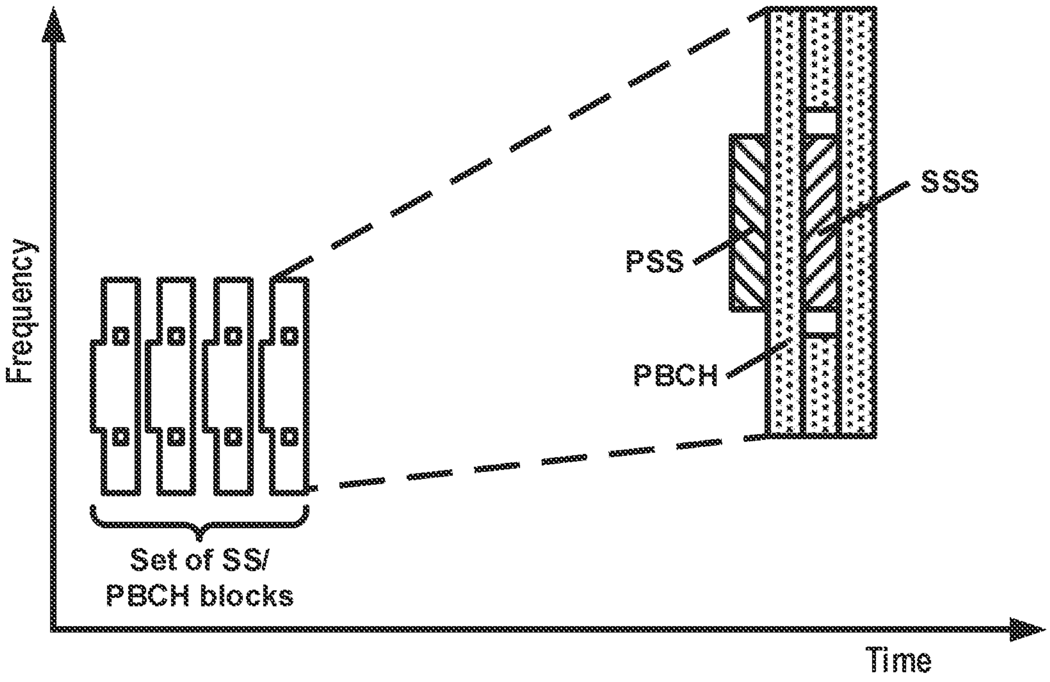
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the quantity/number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame quantity/number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a quantity/number (e.g. a maximum quantity/number) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI.A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a quantity/number (e.g., the maximum quantity/number) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in an SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a quantity/number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a quantity/number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
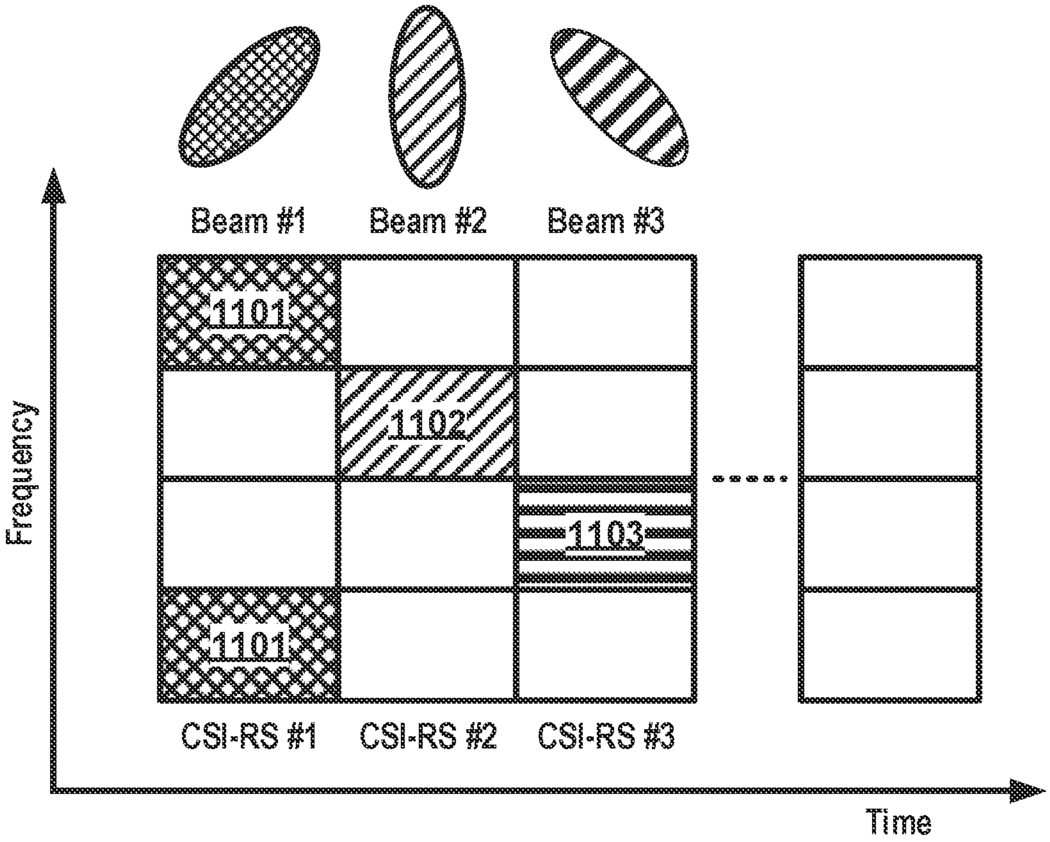
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a quantity/number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a quantity/number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

Figure 12A:
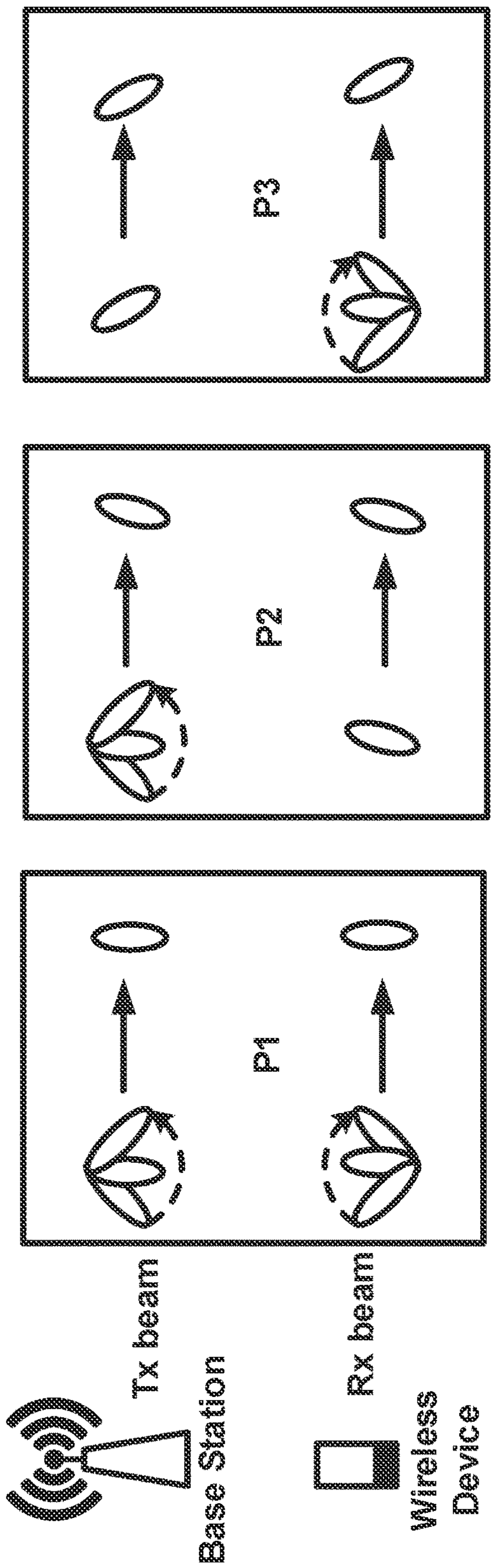
FIG. 12A shows examples of downlink beam management procedures.

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows).

Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

Figure 12B:
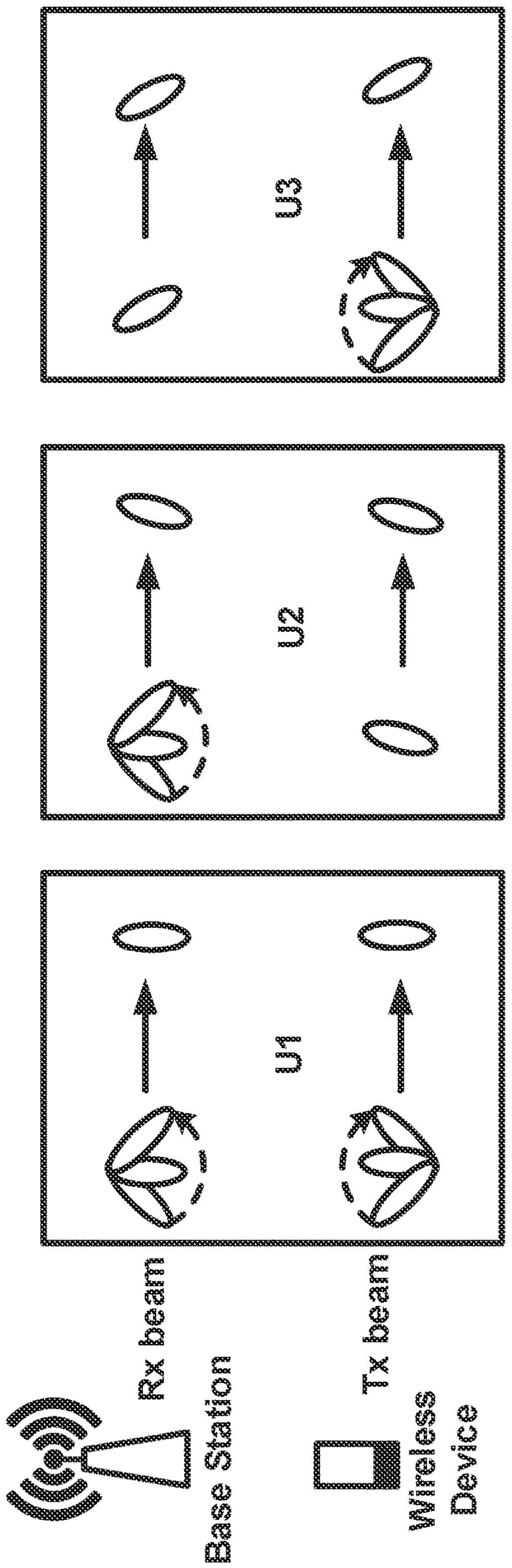
FIG. 12B shows examples of uplink beam management procedures.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the wireless device (e.g., UE) uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figure 13C:
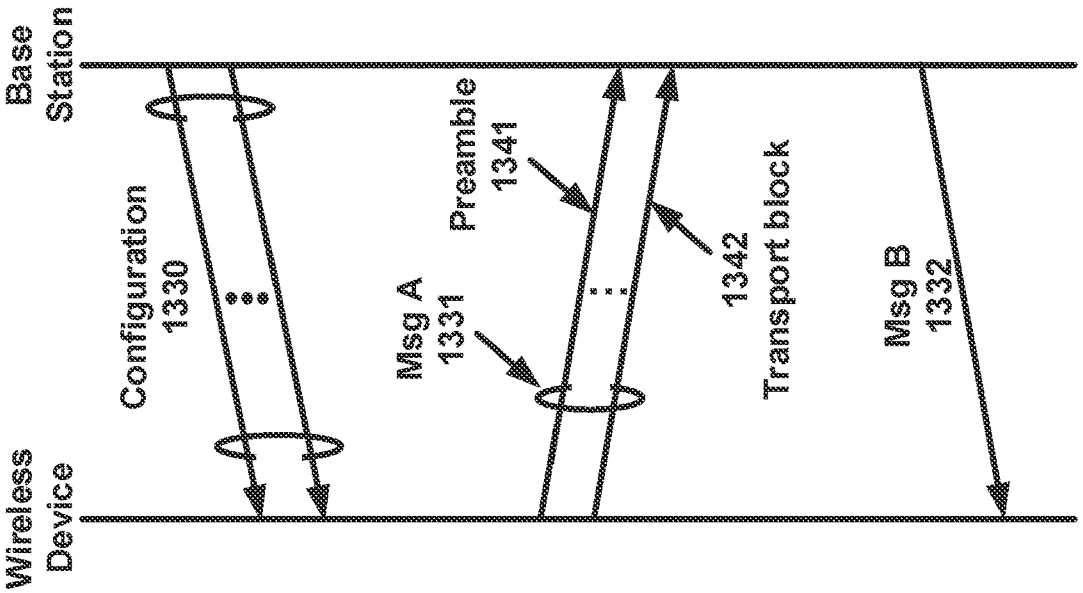
FIG. 13C shows an example two-step random access procedure.
Figure 13B:
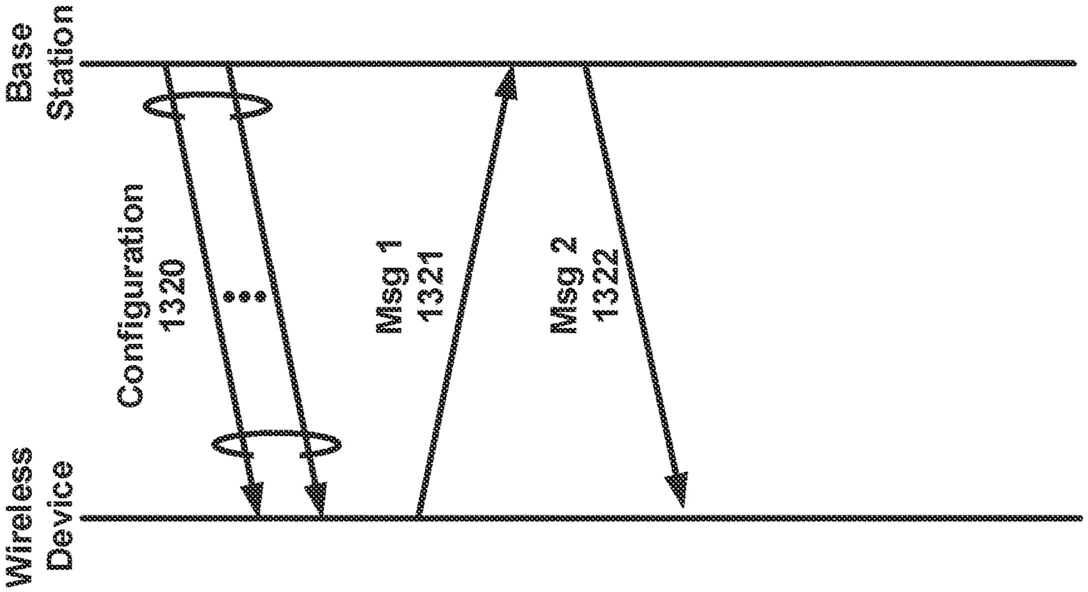
FIG. 13B shows an example two-step random access procedure.
Figure 13A:
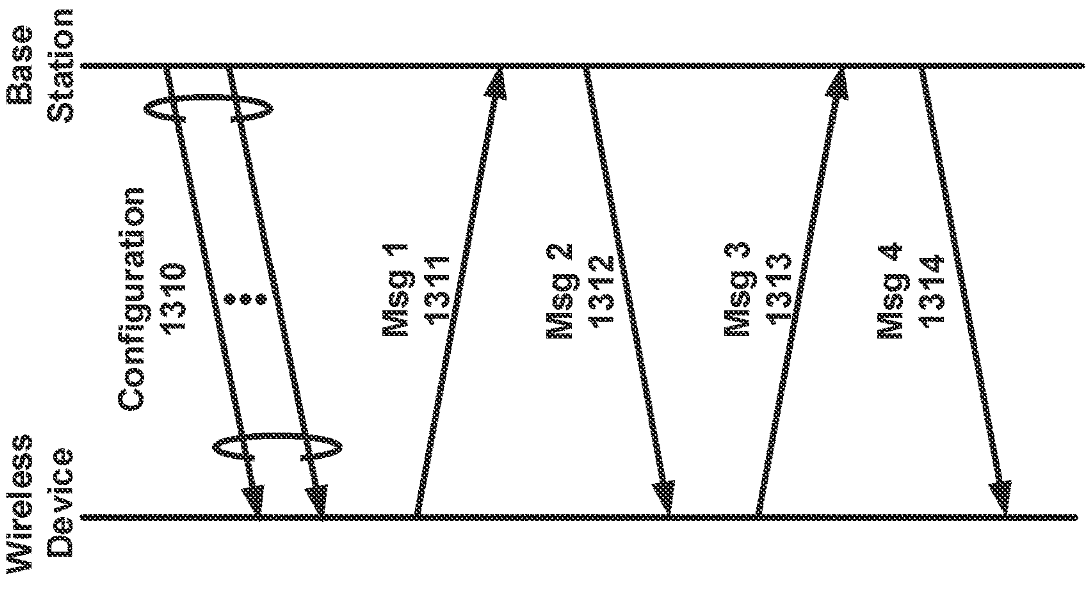
FIG. 13A shows an example four-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received based on (e.g., after or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, based on (e.g., after or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-Response Window) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1

1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$\text{RA-RNTI}=1+s\_id+14\times t\_id+14\times 80\times f\_id+14\times 80\times 8\times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, based on (e.g., after or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, based on (e.g., after or in response to) the sending/transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique CRNT1 of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-Response Window) to monitor a PDCCH for the RAR, for example, based on (e.g., after or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after sending/transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, based on (e.g., after or in response to) sending/transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, based on (e.g., after or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIG. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as “FFFE” in hexadecimal. DCI having CRC parity bits scrambled with a system information RNTI (SI-RNTI) may indicate a broadcast transmission of the system information. The SI-RNTI may be predefined as “FFFF” in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a quantity/number of contiguous control channel elements (CCEs), for example, based on a payload size of the DCI and/or a coverage of the base station. The quantity/number of the contiguous CCEs (referred to as aggregation level) may be 1, 2, 4, 8, 16, and/or any other suitable quantity/number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
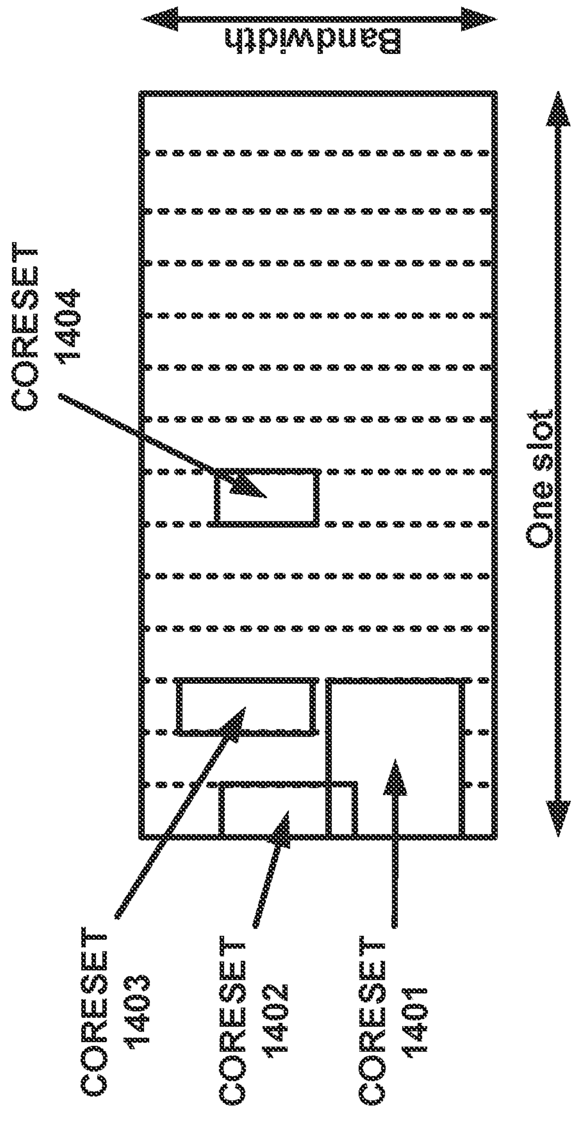
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different quantity/number of resource blocks in frequency domain.

Figure 14B:
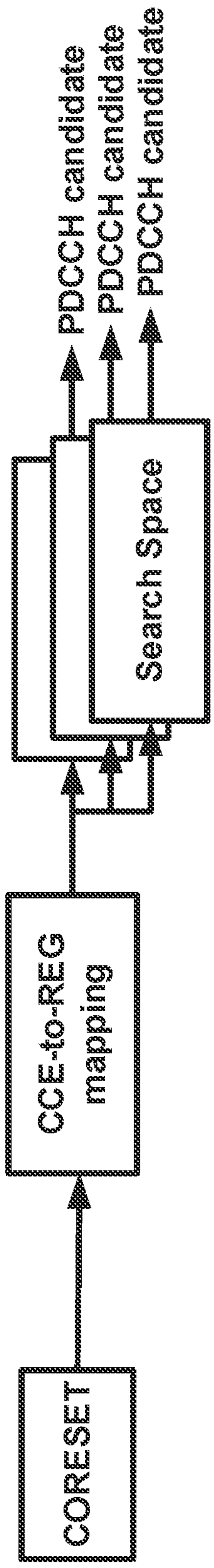
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a quantity/number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a quantity/number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the quantity/number of CCEs, the quantity/number of PDCCH candidates in common search spaces, and/or the quantity/number of PDCCH candidates in the wireless device-specific search spaces) and possible (or configured) DCI formats. The decoding may be referred to as blind decoding. The wireless device may determine DCI as valid for the wireless device, for example, based on (e.g., after or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The may send/transmit uplink control signaling (e.g., UCI) to a base station. The uplink control signaling may comprise HARQ acknowledgements for received DL-SCH transport blocks. The wireless device may send/transmit the HARQ acknowledgements, for example, based on (e.g., after or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a quantity/number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a quantity/number of OFDM symbols (e.g., between four and fourteen OFDM symbols) and may comprise two or fewer bits. The wireless device may use PUCCH format 1, for example, if the transmission is over/via four or more symbols and the quantity/number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a quantity/number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a quantity/number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a quantity/number (e.g. a maximum quantity/number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
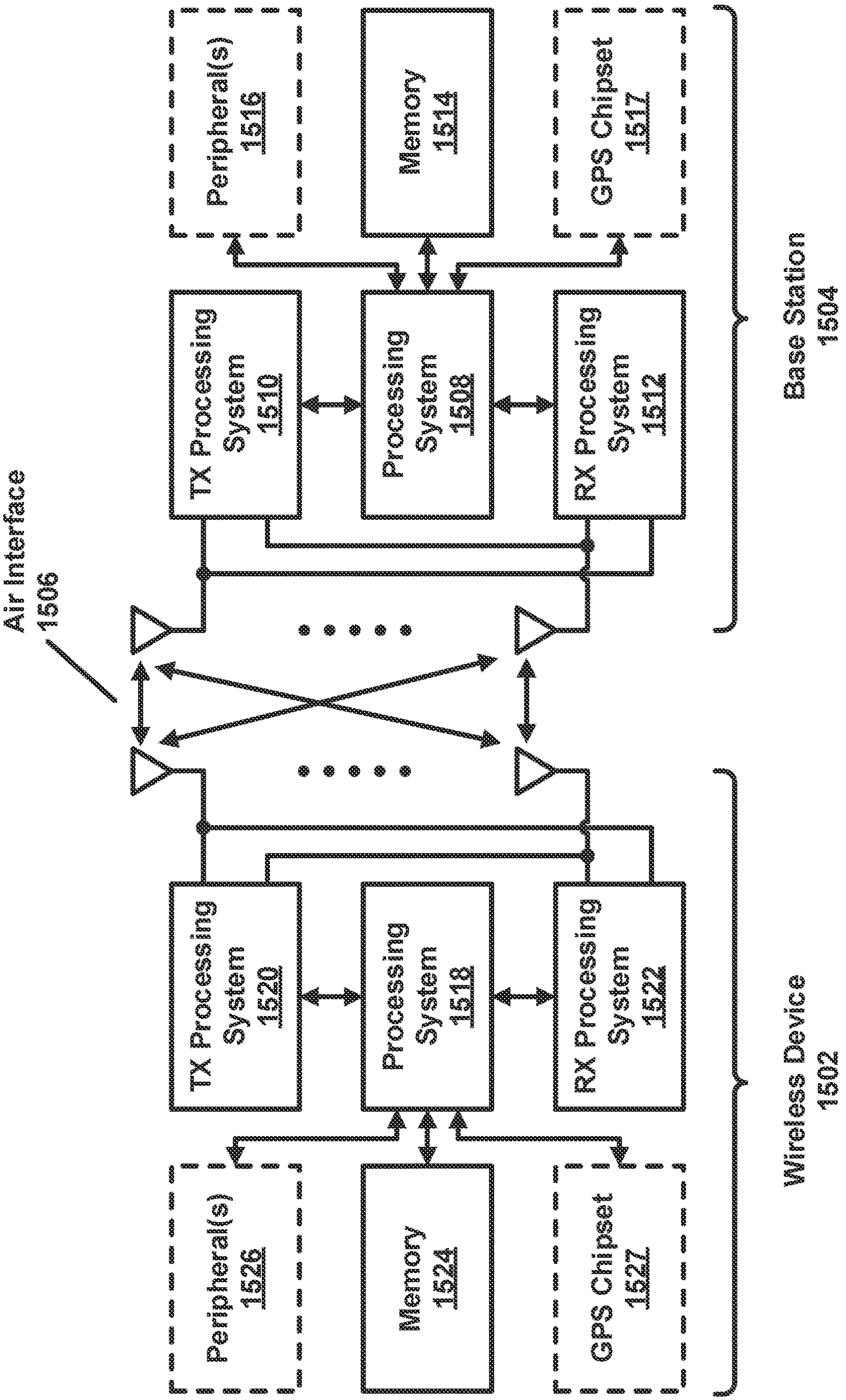
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
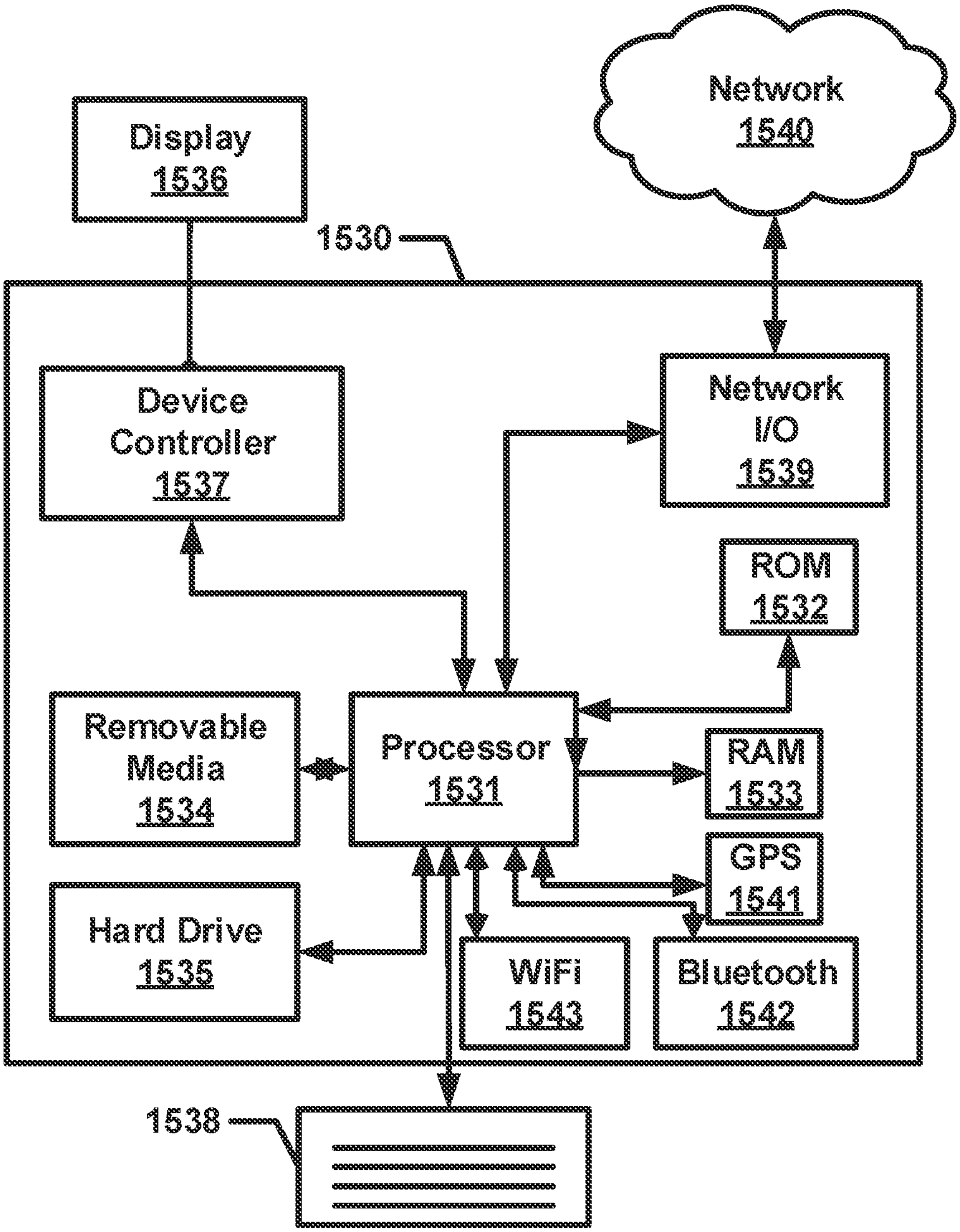
FIG. 15B shows example elements of a computing device that may be used to implement any of the various devices described herein

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a Wi-Fi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

Figure 16A:
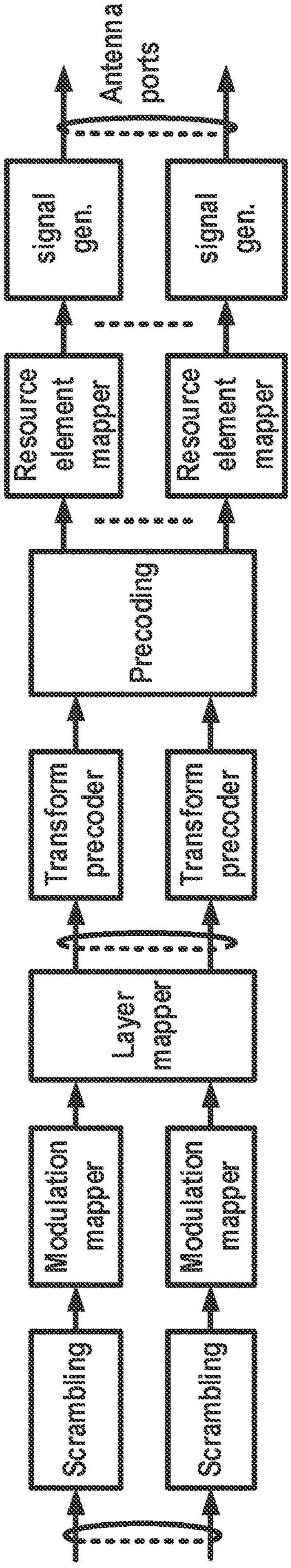
FIG. 16A, FIG. 16B, FIG. 16C, and FIG. 16D show examples of uplink and downlink signal transmission.

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

Figure 16B:
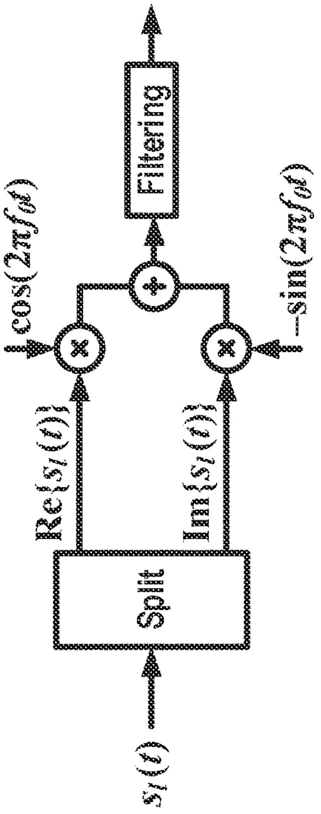

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

Figure 16D:
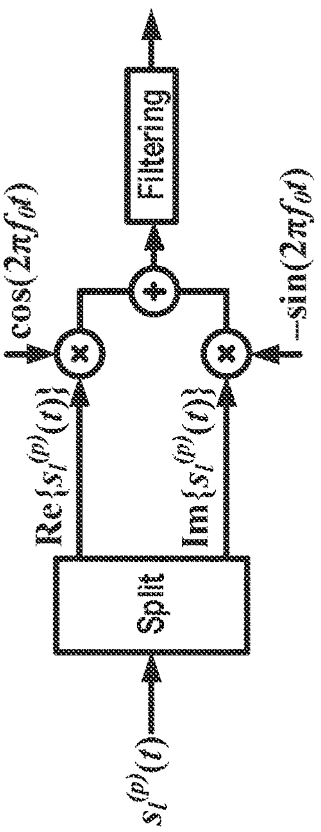
Figure 16C:
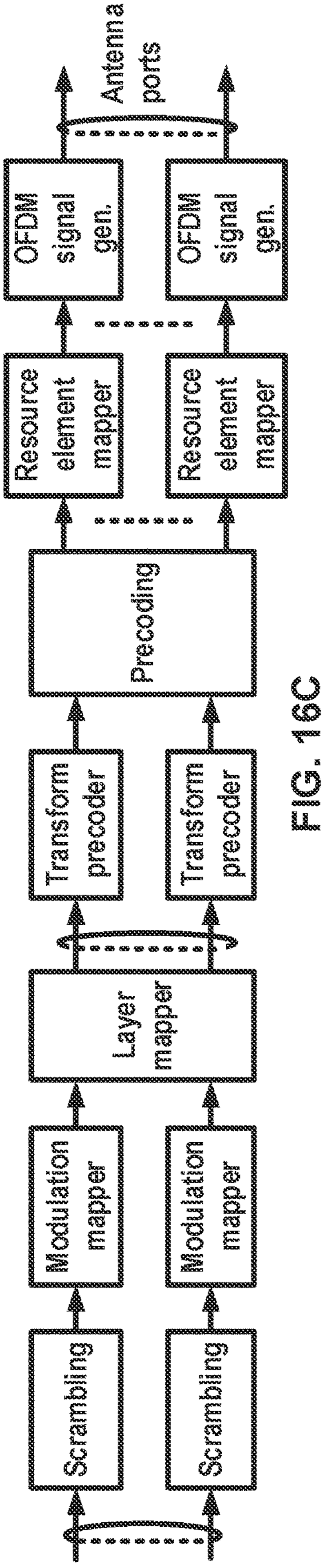

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, after it is started and continue running until it is stopped or until it expires. A timer may be started, for example, if it is not running or restarted if it is running. A timer may be associated with a value (e.g., the timer may be started or restarted from a value or may be started from zero and expire after it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

A wireless device may send (e.g., transmit) a first preamble (e.g., random access preamble, Msg1, random access message 1, RACH transmission, RACH, PRACH, PRACH transmission, random access message, and the like) with a first quantity/number of repetitions. Sending (e.g., transmitting) the first preamble with the first number of repetitions may, for example, be the same as sending (e.g., transmitting) the first number of repetitions of the first preamble. Sending (e.g., transmitting) the first number of repetitions of the first preamble by the wireless device may comprise, for example, a medium access control (MAC) layer (e.g., upper layer) of the wireless device instructing a physical layer (e.g., lower layer) of the wireless device to send (e.g., transmit) the first number of repetitions of the first preamble.

The first quantity/number may be greater (e.g., more, larger, higher, and the like) than one. A wireless device may send (e.g., transmit) the first preamble with the first number of repetitions, for example, to increase coverage (e.g., for coverage enhancement (CE), to increase coverage range, and the like). The wireless device may determine one or more first resources (e.g., PRACH resources, RACH resources, random access resources, MsgA resources, PUSCH resources, uplink resources, and the like) to send (e.g., transmit) the first preamble, for example, based on a first reference signal (e.g., pathloss reference signal, synchronization signal block (SSB), physical broadcast channel (PBCH), channel state information reference signal (CSI-RS), cell-specific reference signal (CRS), and the like). The wireless device may select the first reference signal (RS), for example, based on a first radio link quality (e.g., reference signal received power (RSRP), reference signal received quality (RSRQ), signal to noise ratio (SNR), signal to interference plus noise ratio (SINR), block error rate (BLER), and the like) of the first RS. The wireless device may select the first RS based on the first RS being associated with a highest radio link quality (e.g., highest RSRP) among a plurality of RSs transmitted by a base station.

A wireless device may set a counter (e.g., PREAMBLE_POWER_RAMPING_COUNTER, PREAMBLE_POWER_RAMPING_COUNTER_CE, power ramping counter, preamble power ramping counter and the like) to a first value. The wireless device may use the counter (e.g., a value of the counter, the first value, and the like) to determine a first transmit power (e.g., transmission power, transmitting power, output power, and the like) of the first preamble. The first value may be one. The wireless device may determine the first transmit power to be a first power value. The first value may be two. The wireless device may determine the first transmit power to be a second power value. The second power value may be higher (e.g., greater, larger, more, and the like) than the first power value, for example, based on the second value being higher than the first value.

A base station may, for example, configure (e.g., enable, allow, permit, instruct, request, and the like) a wireless device to send (e.g., transmit) the first preamble with the first quantity/number of repetitions. The base station may, for example, configure the wireless device to send (e.g., transmit) the first preamble with the first number of repetitions to increase (e.g., enhance) coverage (e.g., coverage area of the base station, CE) of the cell.

A wireless device may monitor (e.g., receive, expect to receive, detect, and the like) a control channel (e.g., PDCCH) for a response (e.g., random access response (RAR), fallbackRAR, MsgB, and the like), based on sending (e.g., transmitting) the first preamble with the first quantity/number of repetitions. The wireless device may not receive a response from a base station after (or in response to) sending (e.g., transmitting) the first preamble with the first number of repetitions. The wireless device may (re)send (e.g., (re)transmit) a second preamble with a second number of repetitions. The wireless device may select a second RS to (re)send (e.g., (re)transmit) the second preamble. For example, the wireless device may determine one or more second resources to send (e.g., transmit) the second preamble, for example, based on the second RS. The wireless device may send (e.g., transmit) the second preamble with the second number of repetitions using a second transmit power.

The first RS and the second RS may be different. A wireless device may not increment the counter, for example, based on first RS being different from the second RS, in at least some wireless communications. The second transmit power and the first transmit power may be the same, for example, based on not incrementing the counter. The first RS and the second RS may be the same. The wireless device may increment the counter (e.g., increment by 1, increment a value of the counter by 1, and the like) based on the first RS being the same as the second RS, in at least some wireless communications. The second transmit power may be higher than the first transmit power, for example, based on incrementing the counter. The first quantity/number of repetitions may be different from the second quantity/number of repetitions. The wireless device may increment the counter, regardless of the first number of repetitions and/or the second number of repetitions, based on the first RS being the same as the second RS.

The second quantity/number of repetitions may be greater (e.g., higher, larger, more, and the like) than the first quantity/number of repetitions, in at least some wireless communications. A base station may accumulate (e.g., may be able to accumulate, combine, soft combine, and the like) a higher total (e.g., cumulative, overall, net, effective, and the like) power (e.g., radio link quality, RSRP, RSRP, SNR, SINR, and the like) for the second preamble compared to a total power for the first preamble, based on a wireless device increasing the number of repetitions (e.g., based on the second number of repetitions being higher than the first number of repetitions). Due to a higher total power of/for the second preamble than the total power of/for the first preamble resulting from the second number of repetitions being greater than the first number of repetitions, an additional increase in a transmit power to send (e.g., transmit) the second preamble may be unnecessary. An unnecessary increase in a transmit power by a wireless device may lead to increase in interference(s) in the network, increase in power consumption at the wireless device, and/or reduction of battery life of the wireless device.

The second quantity/number of repetitions and the first quantity/number of repetitions may be different, based on at least some wireless communications. A wireless device may reset the counter (e.g., (re)set to 1, (re)set to 0, (re)set to an initial value, use a new counter with an initial value, and the like), based on the second number of repetitions being different from the first number of repetitions. The wireless device may reset the counter based on the second number of repetitions being different from the first number of repetitions, for example, regardless of whether the first RS and the second RS are the same. Resetting the counter (and/or resetting the counter regardless of whether the first RS and the second RS are the same) may result in reducing/decreasing/resetting a transmit power for sending (e.g., transmitting) the second number of repetitions of the second preamble. Decreasing/resetting the transmit power may lead to a lower total (e.g., cumulative, overall, net, effective, and the like) power (e.g., radio link quality, RSRP, RSRP, SNR, SINR, and the like) of/for the second preamble, (e.g., at a base station) compared to a total power of/for the first preamble. The lower total power of/for the second preamble compared to the total power of/for the first preamble may result in the wireless device not receiving a response from a base station, for example, after (or in response to) sending (e.g., transmitting) the second preamble. It may be likely that the wireless device fails to receive a response from the base station for a second transmission of a second number of repetitions of a second preamble with a second total power, wherein the second total power is lower than the first total power, based on the wireless device failing to receive a response from the base station for a first transmission of a first number of repetitions of a first preamble with/using a first total power. Sending (e.g., transmitting) the second quantity/number of repetitions of the second preamble based on resetting the counter may lead to disadvantages such as an increase in signaling overhead, an increase in power consumption at the base station and the wireless device, an increase in network latency, a waste of resources, and/or a reduction in battery life of the wireless device.

A wireless device may set a counter (e.g., PREAMBLE_POWER_RAMPING_COUNTER, PREAMBLE_POWER_RAMPING_COUNTER_CE, power ramping counter, preamble power ramping counter and the like) to a first value. The wireless device may select (e.g., choose, determine, measure, and the like) a first RS to send (e.g., transmit) a first preamble. The wireless device may send (e.g., transmit) a first quantity/number of repetitions of the first preamble, for example, based on the first value. The wireless device may select a second RS to send (e.g., transmit) a second preamble. The wireless device may send (e.g., transmit) a second number of repetitions of the second preamble. The first RS may be the same as the second RS. The first number of repetitions may be, for example, the same as the second number of repetitions. The wireless device may increment the counter (e.g., increment a value of the counter, increment the counter by 1), for example, based on the first RS being the same as the second RS and the first number of repetitions being the same as the second number of repetitions. A first RS may be the same as a second RS. A first quantity/number of repetitions may be, for example, different from a second quantity/number of repetitions. The wireless device may not increment (e.g., may maintain, may keep the same, and the like) the counter, for example, based on the first number of repetitions being different from the second number of repetitions.

A wireless device may not unnecessarily increase the transmit power of an uplink signal. This may happen if the first RS and the second RS are the same and first quantity/number of repetitions is different from the second quantity/number of repetitions, based on not incrementing (e.g., maintaining, maintaining a value of, and the like) the counter. A second number of repetitions may be higher than a first number of repetitions. Increasing the transmit power for sending (e.g., transmitting) the second preamble may be unnecessary because the second preamble is sent (e.g., transmitted) with higher number of repetitions compared to the transmission of the first preamble. Using a higher number of repetitions may result in a higher total power of all repetitions of a preamble at a base station even with the same transmit power. A total power of the second number of repetitions of the second preamble may be higher than a total power of the first number of repetitions of the first preamble even if the first number of repetitions of the first preamble and the second number of repetitions of the second preamble are sent (e.g., transmitted) with a same transmit power, based on the second number of repetitions being higher than the first number of repetitions.

A wireless device may reduce interference in the network, based on the second quantity/number of repetitions being different from the first quantity/number of repetitions. A wireless device may reduce interference caused by the second number of repetitions of the second preamble on/for one or more uplink and/or downlink transmission of/by/to one or more second wireless devices, for example, based on not using a higher transmit power for sending (e.g., transmitting) the second number of repetitions of the second preamble. The wireless device may reduce power consumption within/by the wireless device and improve battery life of the wireless device based on not increasing transmit power unnecessarily. A wireless device may reduce signaling overhead, reduce power consumption at the wireless device and a base station, reduce latency, reduce wastage of resources, and/or increase battery life of the wireless device based on not resetting/decrementing the counter and/or the transmit power in response to the first number of repetitions and the second number of repetitions being different.

As described herein, a wireless device may receive one or more configuration parameters from a base station. The base station may send (e.g., transmit) the one or more configuration parameters to the wireless device. The wireless device may, for example, receive one or more downlink messages comprising the one or more configuration parameters. The one or more configuration parameters may be, for example, for a cell. The wireless device may be in the cell. The cell may be, for example, a serving cell of/for the wireless device. The cell may be, for example, an unlicensed cell (e.g., shared spectrum channel access cell). The cell may be, for example, a primary cell (PCell). The cell may be, for example, a secondary cell (SCell). The cell may be, for example, a primary secondary cell (PSCell). The cell may be, for example, a special cell (SpCell). The cell may be, for example, a non-terrestrial network (NTN) cell. The cell may be part of a master cell group (MCG). The cell may be part of a secondary cell group (SCG). The base station may, for example, serve the cell.

The one or more configuration parameters may indicate, for example, a plurality of RSs. The plurality of RSs may be, for example, a plurality of SSBs. The plurality of RSs may be, for example, a plurality of CSI-RSs. The plurality of RSs may be, for example, a plurality of SS/PBCH blocks. The plurality of RSs may be, for example, a plurality of CRSs. Each RS of the plurality of RSs may be associated with a respective radio link quality. The plurality of RSs may comprise a first RS and a second RS. The first RS may be associated with a first radio link quality. The second RS may be associated with a second radio link quality. A wireless device may determine the first radio link quality, for example, based on measuring the first RS. The wireless device may determine the second radio link quality, for example, based on measuring the second RS.

A radio link quality of an RS may be an RSRP of the RS. A wireless device may determine the radio link quality of the RS by determining (e.g., measuring, estimating, calculating, computing, and the like) the RSRP of the RS. The radio link quality of an RS may be a received signal strength indication (RSSI) of the RS. The wireless device may determine the radio link quality of the RS by determining the RSSI of the RS. The radio link quality of an RS may be an RSRQ of the RS. The wireless device may determine the radio link quality of the RS by determining the RSRQ of the RS. The radio link quality of an RS may be a SNR of the RS. The wireless device may determine the radio link quality of the RS by determining the SNR of the RS. The radio link quality of an RS may be a SINR of the RS. The wireless device may determine the radio link quality of the RS by determining the SINR of the RS.

A wireless device may select an RS among (e.g., from, from a set of, and the like) the plurality of RSs for a random access procedure. The wireless device may select an RS among the plurality of RSs at random. The wireless device may select an RS associated with a highest (e.g., best, high, greatest, and the like) radio link quality. The wireless device may select an (e.g., any) RS associated with a radio link quality that is higher (e.g., greater, larger, more, and the like) than a threshold (e.g., selection threshold, rsrp-Threshold-SSB, rsrp-ThresholdCSI-RS, rsrp-ThresholdSSB-SUL, and the like).

A wireless device may determine (e.g., select, choose, obtain, and the like) one or more resources (e.g., PRACH resources, RACH resources, random access resources, MsgA resources, PUSCH resources, uplink resources, uplink radio resources, radio resources, preambles, preamble groups, preamble types, features, feature priorities, random access resource sets, PRACH configurations, time and/or frequency resources, PRACH configuration offsets, PRACH configuration indexes, PRACH configuration period scalings, RACH occasions (ROs), PRACH occasion indexes, RACH occasion indexes, scaling factors, mask indexes, preamble start indexes, starting preambles for a partition, and the like), for example, for the random access procedure. The wireless device may determine the one or more resources, for example, based on the selected RS. A first RS may be associated with one or more first resources. A second RS may be associated with, for example, one or more second resources. The wireless device may select, for example, the first RS for the random access procedure. The wireless device may determine one or more first resources for the random access procedure, for example, based on selecting the first RS. The wireless device may select the first RS for the random access procedure. The wireless device may determine (e.g., select, choose, and the like) a first preamble for the random access procedure. The wireless device may determine the first preamble, for example, based on selecting the first RS.

A preamble may be associated with a quantity/number of repetitions. In an example, the number of repetitions of the preamble may be associated with a level (e.g., enhanced coverage level, CE level, repetition level, coverage level, and the like). There may be, for example, a one-to-one mapping between the number of repetitions and the level. A base station may indicate (e.g., via the one or more configuration parameters) a plurality of levels. The plurality of levels may be associated with a plurality of number of repetitions (of a preamble). Each level of the plurality of levels may be associated with a respective number of repetitions of the plurality of number of repetitions. The plurality of levels may comprise a first level, a second level, a third level, and a fourth level. The first level, the second level, the third level, and the fourth level may be different from each other. Two or more levels of the first level, the second level, the third level, and the fourth level may be different (e.g., may not be the same as each other). The plurality of repetitions may comprise a first number of repetitions, a second number of repetitions, a third number of repetitions, and a fourth number of repetitions. Two or more number of repetitions of the first number of repetitions, the second number of repetitions, the third number of repetitions, and the fourth number of repetitions may be different (e.g., not the same as each other). The first number of repetitions may be associated with the first level. The second number of repetitions may be associated with the second level. The third number of repetitions may be associated with the third level. The fourth number of repetitions may be associated with the fourth level.

A wireless device may determine a quantity/number of repetitions of a preamble based on determining (e.g., selecting, choosing, estimating, considering to be, and the like) a level. The wireless device may determine the level, for example, based on measuring a RS. The wireless device may determine the level, for example, based on a radio link quality of a RS. For example, the wireless device may select a first RS among a plurality of RSs for a random access procedure. The first RS may be associated with a first radio link quality. The wireless device may determine the first radio link quality of the first RS, for example, based on measuring the first RS.

A wireless device may determine a level, for example, based on comparing the first radio link quality against one or more thresholds. The one or more thresholds may be indicated by a base station to the wireless device. The one or more thresholds may be indicated, for example, via the one or more configuration parameters. The one or more thresholds may be used, by the wireless device, for determining the level (e.g., level of the wireless device). A quantity/number of thresholds indicated by the base station may be one less than a quantity/number of levels indicated (e.g., configured, supported, and the like) by the base station for the wireless device.

The one or more threshold may comprise a first threshold. The one or more threshold may comprise a second threshold and a third threshold. A wireless device may compare the first radio link quality of the first RS (e.g., the selected RS) against the first threshold. The first radio link quality of the first RS may be higher (e.g., greater, more, bigger, stronger, better, and the like) than the first threshold. The wireless device may determine the level (of the wireless device) to be a first level. The first radio link quality of the first RS may be lower (e.g., less, weaker, worse, smaller, and the like) than the first threshold. The wireless device may compare the first radio link quality of the first RS against the second threshold, for example, based on the first radio link quality of the first RS being lower than the first threshold. The first radio link quality of the first RS may be higher than the second threshold. The wireless device may determine the level to be a second level, for example, based on the first radio link quality of the first RS being higher than the second threshold. The first radio link quality of the first RS may be lower than the second threshold (and the first threshold). The wireless device may compare the first radio link quality of the first RS against the third threshold, for example, based on the first radio link quality of the first RS being lower than the second threshold (and the first threshold). The first radio link quality of the first RS may be higher than the third threshold. The wireless device may determine the level to be a third level, for example, based on the first radio link quality of the first RS being higher than the third threshold (and lower than the second threshold and the first threshold). The first radio link quality of the first RS may be lower than the third threshold (and the second threshold and the first threshold). The wireless device may determine the level to be a fourth level, for example, based on the first radio link quality of the first RS being lower than the third threshold (and the second threshold and the first threshold). The wireless device may determine the level as below:

- if the first radio link quality of the first RS is higher than the first threshold, the wireless device may determine the level to be a first level.
- else, if the first radio link quality of the first RS is higher than the second threshold, the wireless device may determine the level to be a second level.
- else, if the first radio link quality of the first RS is higher than the third threshold, the wireless device may determine the level to be a third level.
- else, the wireless device may determine the level to be a fourth level.

A wireless device may determine the level to be a first level. The first level may be associated with a first quantity/number of repetitions. The wireless device may determine to use the first number of repetitions of a first preamble, for example, based on determining the level to be the first level. The wireless device may determine the level to be a second level. The second level may be associated with a second number of repetitions. The wireless device may determine to use the second number of repetitions of a first preamble, for example, based on determining the level to be the second level. The wireless device may determine the level to be a third level. The third level may be associated with a third number of repetitions. The wireless device may determine to use the third number of repetitions of a first preamble, for example, based on determining the level to be the third level. The wireless device may determine the level to be a fourth level. The fourth level may be associated with a fourth number of repetitions. The wireless device may determine to use the fourth number of repetitions of a first preamble, for example, based on determining the level to be the fourth level. The first number of repetitions may be less than the second number of repetitions. The second number of repetitions may be less than the third number of repetitions. The third number of repetitions may be less than the fourth number of repetitions.

A quantity/number of repetitions and an associated level (or a level and an associated quantity/number of repetitions) may be used interchangeably. A first level may be associated with a first number of repetitions and a second level may be associated with a second number of repetitions. A wireless device may determine, for example, a level (of the wireless device) to be the first level. Determining the level to be the first level may, for example, be the same as determining the number of repetitions to be the first number of repetitions. The wireless device may determine, for example, a number of repetitions to be the second number of repetitions. Determining the number of repetitions to be the second number of repetitions may, for example, be the same as determining a level to be the second level. The first number of repetitions and the second number of repetitions may be the same. The first level and the second level may be the same, for example, based on the first number of repetitions and the second number of repetitions being the same. The wireless device may determine that the first number of repetitions and the second number of repetitions are the same. The wireless device may determine that the first level and the second level are the same, for example, based on the first number of repetitions and the second number of repetitions being the same. The first number of repetitions may be associated with a first value. The first level may be associated with the first value, for example, based on the first number of repetitions being associated with the first value.

Sending (e.g., transmitting) a quantity/number of repetitions of a preamble may comprise sending (e.g., transmitting) the (same) preamble the quantity/number of times. The number of repetitions may be one. A wireless device may transmit the preamble once, for example, based on the number of repetitions being one. The number of repetitions being one may be considered to be preamble without repetitions. The number of repetitions may be two. The wireless device may transmit the preamble. The wireless device may subsequently transmit the same preamble again for a total of two times, for example, based on the number of repetitions being two.

The quantity/number of repetitions may be higher than one. The wireless device may send (e.g., transmit) a plurality of repetitions of the preamble. Sending (e.g., transmitting) a plurality of repetitions of the preamble (or sending (e.g., transmitting) a number of repetitions of the preamble, wherein the number of repetitions is higher than one) may be referred to, for example, as multiple preamble transmission, multiple Msg1 transmission, multiple PRACH transmission, multiple RACH transmission, mult-Msg1 repetition, multi-Msg1 transmission, random access message repetition, multiple random access message transmission, and the like. Sending (e.g., transmitting) one repetition of the preamble may also be referred to as sending (e.g., transmitting) the preamble with no repetitions (or without repetitions).

An nth preamble, $x_{u,v}(n)$, may be generated by a wireless device according to $$x_{u,v}(n) = x_u((n + C_v)\mathrm{mod}L_{RA})$$

$$x_u(i) = e^{-j\frac{\pi u i(i+1)}{L_{RA}}},\ i = 0, 1, \ldots, L_{RA} - 1$$

from which the frequency-domain representation is generated according to $$y_{u,v}(n) = \sum_{m=0}^{L_{RA}-1} x_{u,v}(m) \cdot e^{-j\frac{2\pi mn}{L_{RA}}}$$

where $L_{RA}$=839, $L_{RA}$=139, $L_{RA}$=1151, or $L_{RA}$=571 depending on the PRACH preamble format. There may be 64 preambles defined in each time-frequency PRACH occasion, enumerated in increasing order of first increasing cyclic shift C, of a logical root sequence, and then in increasing order of the logical root sequence index, starting with the index obtained from the higher-layer parameter prach-RootSequenceIndex or rootSequenceIndex-BFR or by msgA-PRACH-RootSequenceIndex if configured and a type-2 random-access procedure may be initiated, such as described in clause 8.1 of [5, TS 38.213]. Additional preamble sequences, in case 64 preambles cannot be generated from a single root Zadoff-Chu sequence, may be obtained from the root sequences with the consecutive logical indexes until all the 64 sequences are found. The logical root sequence order may be cyclic; the logical index 0 may be consecutive to $L_{RA}-2$. The sequence number u may be obtained from a logical root sequence index according to preconfigured table(s).

A wireless device may transmit a quantity/number of repetitions of a preamble. The number of repetitions may be higher than one. Each repetition of the preamble of the number of repetitions of the preamble may comprise a second number of repetitions of a sequence. The sequence may be a Zadoff-Chu sequence, logical root sequence, root sequence, and the like. The number of repetitions of the preamble may comprise transmitting the number of repetitions of a second number of repetitions of the sequence. The number of repetitions may be two. The second number of repetitions may be four. Sending (e.g., transmitting) the number of repetitions of the preamble may comprise sending (e.g., transmitting) eight repetitions of the sequence. The number of repetitions of the preamble and the second number of repetitions of the sequence may, for example, be the same. The number of repetitions of the preamble and the second number of repetitions of the sequence may, for example, be different. The number of repetitions of the preamble may be one. The second number of repetitions of the sequence may be four. Sending (e.g., transmitting) the number of repetitions (e.g., one, no repetitions, and the like) of the preamble may comprise sending (e.g., transmitting) the sequence four times, for example, based on the second number of repetitions being four.

A wireless device may determine a quantity/number of repetitions of a preamble. Determining a number of repetitions of a preamble may comprise determining to send (e.g., transmit) the number of repetitions of the preamble. The wireless device may determine one or more resources. Determining the one or more resources may comprise determining to send (e.g., transmit) an uplink signal (e.g., PRACH signal, RACH signal, preamble, Msg1, Msg3, PUSCH, PUCCH, and the like) over/using/via the one or more resources. The wireless device may determine a preamble based on an RS. Determining the preamble may comprise determining to send (e.g., transmit) the preamble.

Figure 17:
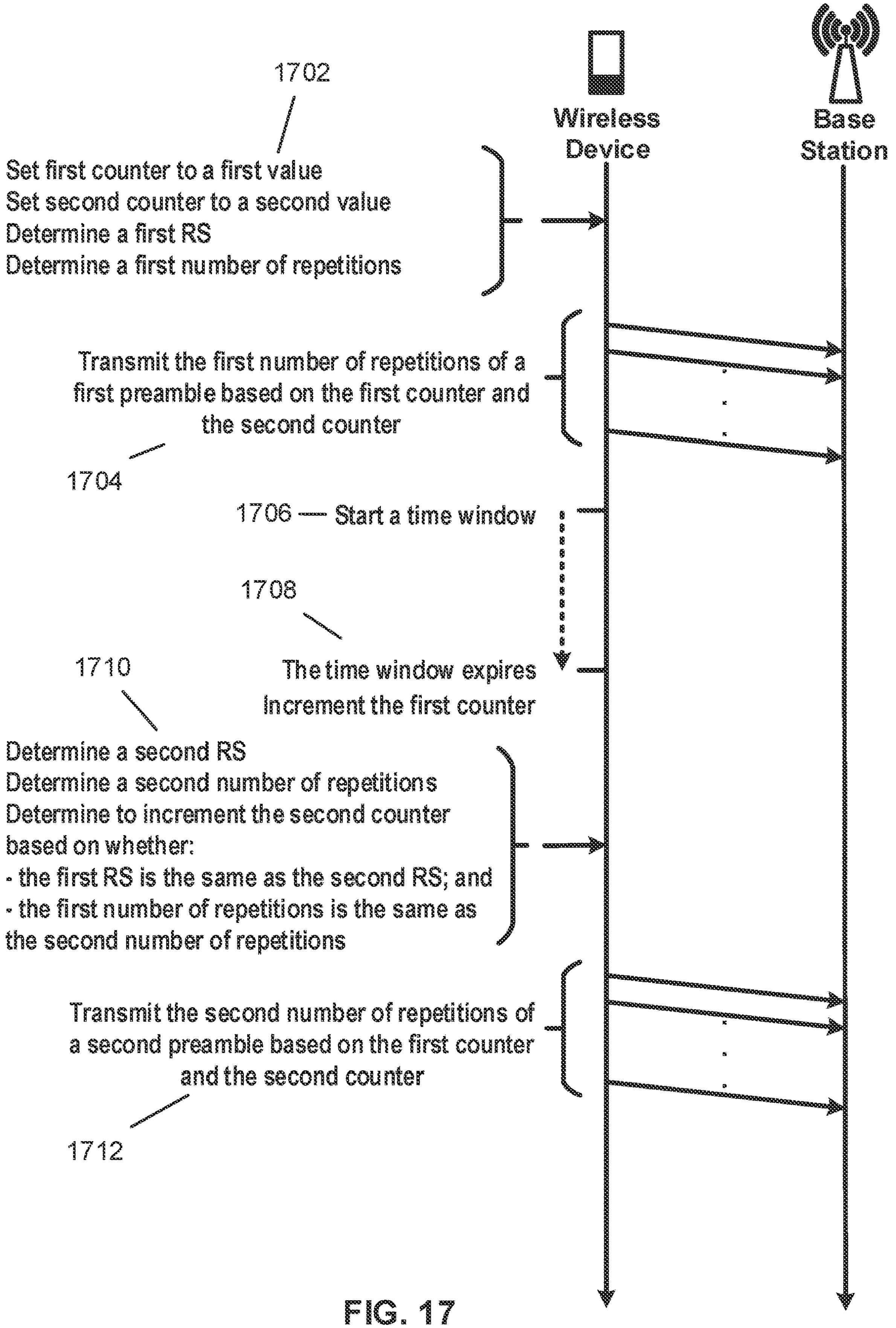
FIG. 17 shows an example timing diagram.

FIG. 17 shows an example timing diagram. A wireless device may set a first counter (e.g., preamble transmission counter, preamble transmission counter per CE, and the like) to a first value, in step 1702. The first value may be, for example, one. The first value may be, for example, zero. The first value may be, for example, indicated by a base station via the one or more configuration parameters. The wireless device may, for example, set a second counter (e.g., power ramping counter, preamble power ramping counter, and the like) to a second value. The second value may be, for example, one. The second value may be, for example, zero. The second value may be, for example, indicated by the base station via the one or more configuration parameters.

A wireless device may determine (e.g., select, choose, consider, pick, measure, estimate, calculate, compute, and the like) a first RS. For example, the wireless device may determine the first RS based on a first radio link quality of the first RS being higher than one or more radio link qualities. The wireless device may determine the first RS, for example, based on the first radio link quality of the first RS being higher than a threshold (e.g., rsrp-ThresholdSSB, rsrp-ThresholdCSI-RS, and the like). The wireless device may determine a first preamble, for example, based on the first RS. The first RS may be associated with a first set of preambles. The wireless device may determine (e.g., pick, select, choose, and the like) the first preamble from the first set of preambles, for example, at random. The wireless device may determine a first quantity/number of repetitions of the first preamble, for example, based on the first RS. The first number of repetitions may be, for example, 1, 2, 4, 8, 16, and the like.

A wireless device may determine one or more first resources based on the first RS. The wireless device may send (e.g., transmit) the first quantity/number of repetitions of the first preamble over/via/using the one or more first resources. The wireless device may send (e.g., transmit) the first number of repetitions of the first preamble, for example, based on the first counter, in step 1704. A value (e.g., the first value) of the first counter may be less than a maximum value (e.g., preamble TransMax). The wireless device may send (e.g., transmit) the first number of repetitions of the first preamble, for example, based on the first value being less than the maximum value.

A wireless device may send (e.g., transmit) the first quantity/number of repetitions of the first preamble, for example, based on the second counter. The wireless device may determine a first transmit power, for example, based on a value (e.g., the second value) of the second counter. The wireless device may determine the first transmit power, for example, based on an equation comprising the second value. The equation may comprise, for example, a target received power (e.g., preambleReceivedTargetPower). The equation may comprise, for example, one or more offset values (e.g., DELTA_PREAMBLE, POWER_OFFSET_2 STEP_RA, and the like). The equation may comprise, for example, a step value (e.g., PREAMBLE_POWER_RAMPING_STEP). The equation may comprise a maximum output power (e.g., $P_{CMAX,f,c}$, maximum output power configured for the wireless device, and the like). The equation may comprise, for example, a pathloss. The wireless device may determine the pathloss, for example, based on measuring the first RS. The equation may be, for example, the first transmit power=max(the maximum output power, the pathloss+the target received power+the one or more offset values+(the second value−1)*the step value). The wireless device may send (e.g., transmit) the first number of repetitions of the first preamble, for example, using/with the first transmit power. The wireless device may send (e.g., transmit) each repetition, of the first number of repetitions, of the first preamble with/using the first transmit power. The wireless device may send (e.g., transmit) each repetition, of the first number of repetitions, of the first preamble with/using the first transmit power divided by the first number of repetitions (or minus 10*log 10(the first number of repetitions)).

A wireless device may start a time window (e.g., ra-ResponseWindow) to monitor a PDCCH for a response (e.g., MsgB, RAR, fallbackRAR, PDCCH, and the like) from a base station, for example, after sending (e.g., transmitting) the first quantity/number of repetitions of the first preamble (or based on sending (e.g., transmitting) the first quantity/number of repetitions of the first preamble), in the example of FIG. 17 step 1706. The wireless device may start the time window, for example, after 4 slots/subframes from a slot/subframe carrying the last repetition of the first number of repetitions. The wireless device may start the time window, for example, after 4 slots/subframes plus a round-trip time (RTT) from a slot/subframe carrying the last repetition of the first number of repetitions. The RTT may correspond to two times a number of slots/subframes spanned by the time taken for a signal to travel from the wireless device to the base station. The wireless device may start the time window, for example, after 4 slots/subframes from a slot/subframe carrying a first repetition of the first number of repetitions. The wireless device may start the time window, for example, after 4 slots/subframes from a slot/subframe carrying a second repetition of the first number of repetitions. The wireless device may start a plurality of time windows associated with the first number of repetitions of the first preamble. Each time window of the plurality of time windows may correspond to (or be associated with) a respective repetition of the first preamble of the first number of repetitions of the first preamble.

A wireless device may determine the random access procedure to be unsuccessful (e.g., not successful, unsuccessfully completed, not successfully completed, a random access problem, and the like). The wireless device may determine the random access procedure to be unsuccessful, for example, at the end of the time window. Determining the random access procedure to be unsuccessful may comprise, for example, not receiving a response (e.g., MsgB, random access response (RAR), fallbackRAR, PDCCH, DCI, and the like) from the base station before (e.g., within, at, around, prior to, in advance of, if, and, together with, and the like) an expiry of the time window. Determining the random access procedure to be unsuccessful may comprise, for example, not receiving, from the base station, a random access response (RAR) comprising a random access preamble identifier that matches a preamble index (e.g., PREAMBLE_INDEX) of the first preamble (e.g., any repetition of the first quantity/number of repetitions of the first preamble) before the expiry of the time window. Determining the random access procedure to be unsuccessful may comprise, for example, receiving, from the base station, a response comprising a random access preamble identifier that does not match the preamble index (e.g., PREAMBLE_INDEX) of the first preamble (e.g., any repetition of the first number of repetitions of the first preamble) before the expiry of the time window.

A wireless device may determine to resend (e.g., retransmit) a preamble, for example, based on determining the random access procedure to be unsuccessful at the expiry of the time window. The wireless device may determine to (re)select one or more second resources to send (e.g., transmit) a second preamble, for example, based on determining the random access procedure to be unsuccessful at the expiry of the time window. The wireless device may increment the first counter (e.g., preamble transmission counter, preamble transmission counter per CE, PREAMBLE_TRANSMISSION_COUNTER, PREAMBLE_TRANSMISSION_COUNTER_CE, and the like), based on determining the random access procedure to be unsuccessful at the expiry of the time window. The wireless device may increment, for example in step 1708, the first value of the first counter. A value of the first counter may be greater (e.g., higher, more, larger, bigger, and the like) than one, based on incrementing the first counter (or based on incrementing the first value of the first counter).

The first counter (or a value of the first counter) may be greater than (or equal to) a maximum value (e.g., a transmission threshold, preamble TransMax, preambleTransMax+1, and the like), for example, after a wireless device increments the first counter. The wireless device may consider the random access procedure to be unsuccessfully completed, for example, based on the first counter (or a value of the first counter) being greater than (or equal to) the maximum value. The first counter (or a value of the first counter) may be less than a maximum value (e.g., a transmission threshold, preambleTransMax, preambleTransMax+1, and the like), for example, after the wireless device increments the first counter. The wireless device may not consider (e.g., determine) the random access procedure to be completed (e.g., unsuccessfully completed) based on the first counter (or a value of the first counter) being less than the maximum value (e.g., a transmission threshold, preamble TransMax, preambleTransMax+1, and the like), for example, after the wireless device increments the first counter.

A wireless device may select a second RS for the random access procedure, for example in step 1710, based on not determining (e.g., considering) the random access procedure to be completed (e.g., unsuccessfully completed) or based on determining the random access procedure to be not completed. The wireless device may determine (e.g., select, choose, estimate, measure, and the like) the second RS for the random access procedure, for example, based on determining the random access procedure to be unsuccessful (e.g., not completed, unsuccessful but not completed, and the like) at the expiry of the time window. The wireless device may determine (e.g., select, choose, pick, and the like) a second preamble, for example, based on determining the random access procedure to be unsuccessful (e.g., not completed, unsuccessful but not completed, and the like) at the expiry of the time window. The wireless device may determine the second preamble, for example, based on the second RS. The wireless device may determine the second preamble, for example, for the random access procedure.

A wireless device may determine a second quantity/number of repetitions for the second preamble. The wireless device may determine the second number of repetitions, for example, based on a second radio link quality of the second RS. The wireless device may use a same procedure to determine the second number of preambles based on the second radio link quality of the second RS as the wireless device used for determining the first number of preambles based on the first radio link quality of the first RS. The wireless device may determine to increment the second counter (or a value of the second counter, or the second value of the second counter) based on whether the first RS and the second RS are the same and the first number of repetitions and the second number of repetitions are the same. The wireless device may determine to maintain (e.g., keep the same, use the same, sustain, hold, fix, and the like) the second counter (e.g., a value of the second counter, the second value of the second counter, the second value), for example, based on whether the first RS and the second RS are the same and the first number of repetitions and the second number of repetitions are the same. The wireless device may determine a value of the second counter (e.g., whether to increment the second value, whether to increment the second counter, whether to maintain the second value, whether to maintain the second counter, and the like) based on whether the first RS and the second RS are the same and the first number of repetitions and the second number of repetitions are the same. The first RS may be the same as the second RS. For example, a first index (e.g., SSB index, CSI-RS index, identity, identifier) of the first RS and a second index of the second RS may be the same. The first RS may be the same as the second RS, for example, based on the first index being the same as the second index.

The first quantity/number of repetitions and the second quantity/number of repetitions may be the same. A wireless device may increment the second counter (e.g., the second value of the second counter, a value of the second counter), for example, based on the first number of repetitions being the same as the second number of repetitions and the first RS being the same as the second RS. Incrementing the second counter may comprise (or be the same as) incrementing a value of the second counter. Incrementing the second counter may comprise incrementing the second counter by one. Incrementing the second counter may comprise incrementing the second value of the second counter by one.

The first RS and the second RS may be the same. The first quantity/number of repetitions and the second quantity/number of repetitions may not be the same (e.g., may be different, the second quantity/number of repetitions may be higher than the first quantity/number of repetitions, the second quantity/number of repetitions may be lower than the first quantity/number of repetitions, and the like). A wireless device may not increment (e.g., may maintain) the second counter (or may not increment the second value of the second counter), for example, based on the first RS and the second RS being the same and the first number of repetitions and the second number of repetitions being different (or not being the same). Not incrementing the second counter may comprise maintaining (e.g., keeping the same, holding, sustaining, using the same, not changing, not varying, not decrementing, not reducing and the like) the second counter. Not incrementing the second counter may comprise maintaining a value (e.g., the second value) of the second counter. The first RS and the second RS may be different. The first number of repetitions and the second number of repetitions may be the same. The wireless device may not increment (e.g., may maintain) the second counter (or a value (e.g., the second value) of the second counter), for example, based on the first RS and the second RS being different and the first number of repetitions and the second number of repetitions being different.

A wireless device may transmit the second quantity/number of repetitions of the second preamble, for example in step 1712, based on the second counter. The wireless device may determine a second transmit power, for example, based on a value (e.g., the second value, the increment of the second value, the second value+1, and the like) of the second counter (or based on the second counter). The wireless device may determine the second transmit power, for example, based on an equation comprising the second value (e.g., second value+1). The equation may comprise, for example, a target received power (e.g., preambleReceivedTargetPower, preambleInitialReceivedTargetPower, preambleInitialReceivedPower, and the like). The equation may comprise, for example, one or more offset values (e.g., DELTA_PREAMBLE, POWER_OFFSET_2 STEP_RA, and the like). The equation may comprise, for example, a step value (e.g., PREAMBLE_POWER_RAMPING_STEP). The equation may comprise, for example, a maximum output power (e.g., $P_{CMAX,f,c}(i)$, maximum output power configured for the wireless device, and the like). The equation may comprise, for example, a pathloss (e.g., PL(i)). The wireless device may determine the pathloss, for example, based on measuring the second RS. The equation may be, for example, the second transmit power=max(the maximum output power, (the pathloss+the target received power+the one or more offset values+(the second value−1)* the step value)). The components in the equation may, for example, be in a logarithmic (decibel) scale. The wireless device may transmit the second number of repetitions of the second preamble, for example, using/with the second transmit power. The wireless device may transmit each repetition, of the second number of repetitions, of the second preamble with/using the second transmit power. The wireless device may transmit each repetition, of the second number of repetitions, of the second preamble using/with the second transmit power divided by the second number of repetitions (or minus 10*log 10(the second number of repetitions)).

Incrementing the second counter (e.g., PREAMBLE_POWER_RAMPING_COUNTER, power ramping counter, preamble power ramping counter, and the like) may be the same as increasing a transmit power for transmitting the second quantity/number of repetitions of the second preamble. The wireless device may increment the second counter. The second transmit power may be, for example, higher than the first transmit power, based on incrementing the counter for/before sending (e.g., transmitting) the second number of repetitions of the second preamble. The second transmit power may be higher than the first transmit power, for example, by the step value. The second transmit power minus the first transmit power may be, for example, the step value. The wireless device may not increment the counter (e.g., may maintain the counter, maintain the second value of the second counter, keep a same value of the counter, and the like). The second transmit power may be the same as the first transmit power, based on incrementing the counter for sending (e.g., transmitting) the second number of repetitions of the second preamble.

Figure 18A:
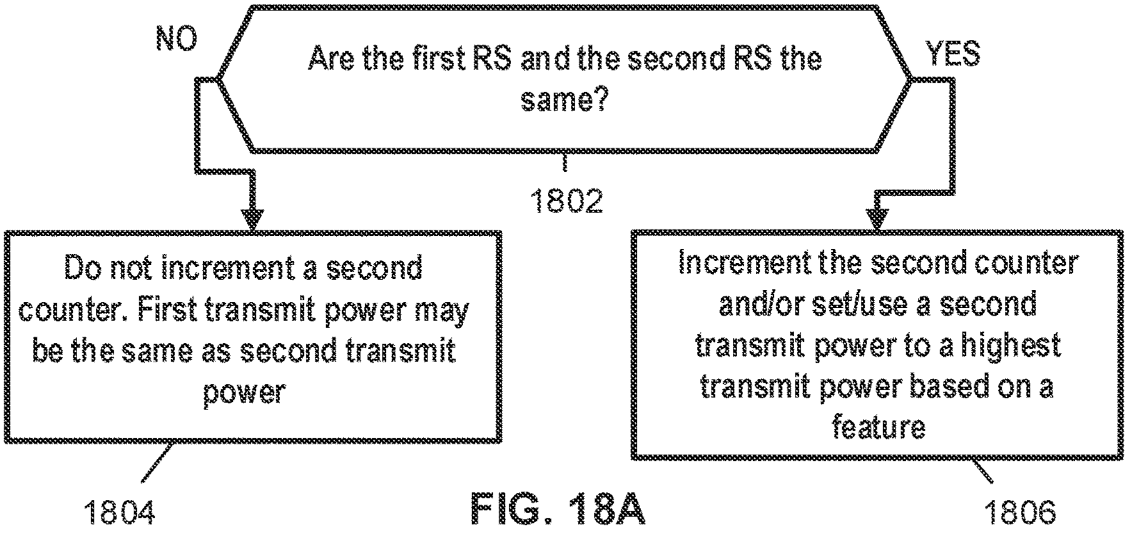
FIG. 18A shows an example method for transmission power determination based on reference signals.

FIG. 18A shows an example method for transmission power determination based on reference signals. A first RS and a second RS may, for example in step 1802, be the same. In step 1806, a wireless device may increment the second counter by more than one (e.g., by/to a highest (possible) value, PREAMBLE_POWER_RAMPING_COUNTER_MAX, and the like), for example, based on a feature (e.g., regardless of the first quantity/number of repetitions and/or the second quantity/number of repetitions), in response to the first RS being the same as the second RS. The wireless device may set/use the second transmit power to be a highest transmit power (e.g., maximum transmit power, PCmax, maximum output power for the wireless device, $P_{CMAX,f,c}(i)$, maximum output power configured for the wireless device, and the like) for example, based on the feature (e.g., regardless of the first number of repetitions and/or the second number of repetitions), in response to the first RS being the same as the second RS. The wireless device may set/use the first transmit power to be the highest transmit power (e.g., maximum transmit power, PCmax, maximum output power for the wireless device, $P_{CMAX,f,c}(i)$, maximum output power configured for the wireless device, and the like) for example, based on the feature.

The first RS and the second RS may not be the same, based on step 1802. A wireless device may not increment (e.g., may maintain) the second counter, for example in step 1804, based on a feature (e.g., regardless of the first quantity/number of repetitions and/or the second quantity/number of repetitions), in response to the first RS not being the same as (or being different from) the second RS. The wireless device may transmit the second number of repetitions of the second preamble using a second transmit power.

The second transmit power may be the same as the first transmit power, for example, based on maintaining the second counter.

Figure 18B:
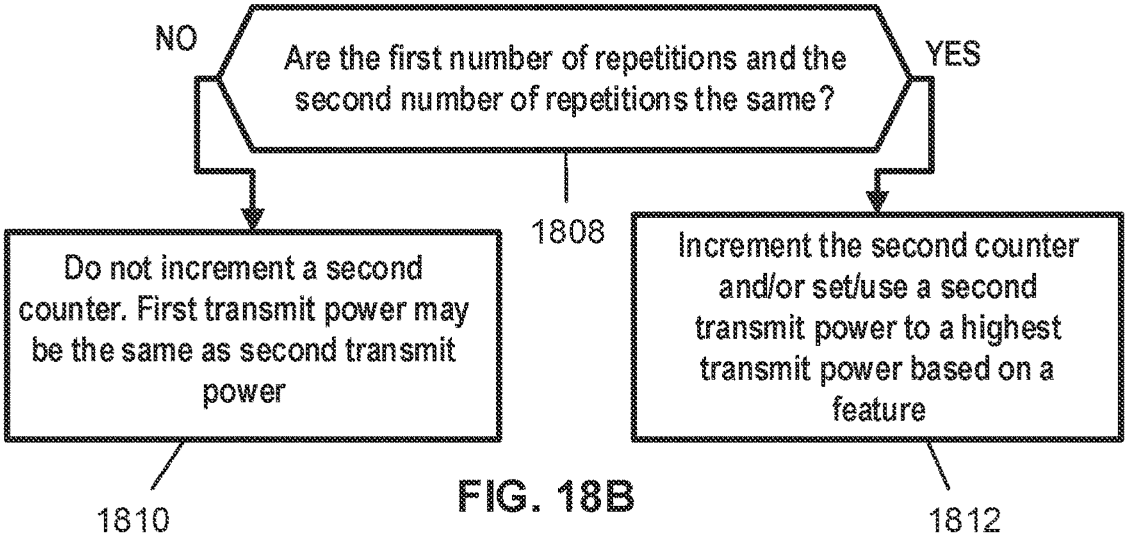
FIG. 18B shows an example method for transmission power determination based on a quantity of repetitions.

FIG. 18B shows an example method for transmission power determination based on a quantity of repetitions. A first quantity/number of repetitions and the second quantity/number of repetitions, for example in step 1808, may be the same. A wireless device may increment the second counter by more than one (e.g., by/to a highest (possible) value, PREAMBLE_POWER_RAMPING_COUNTER_MAX, and the like), based on the first number of repetitions being the same as the second number of repetitions, in step 1812. The wireless device may set/use the second transmit power to be a highest transmit power (e.g., maximum transmit power, PCmax, maximum output power for the wireless device, $P_{CMAX,f,c}(i)$, maximum output power configured for the wireless device, and the like), based on the first number of repetitions being the same as the second number of repetitions. The wireless device may set/use the first transmit power to be the highest transmit power (e.g., maximum transmit power, PCmax, maximum output power for the wireless device, $P_{CMAX,f,c}(i)$, maximum output power configured for the wireless device, and the like) for example, based on the feature.

The first quantity/number of repetitions and the second quantity/number of repetitions may not be the same (e.g., may be different), in step 1808. A wireless device may not increment (e.g., may maintain) the second counter, based on the first number of repetitions and the second number of repetitions not being the same (or being different), in step 1810. The wireless device may transmit the second number of repetitions of the second preamble using a second transmit power. The second transmit power may be the same as the first transmit power, for example, based on maintaining the second counter.

Figure 18C:
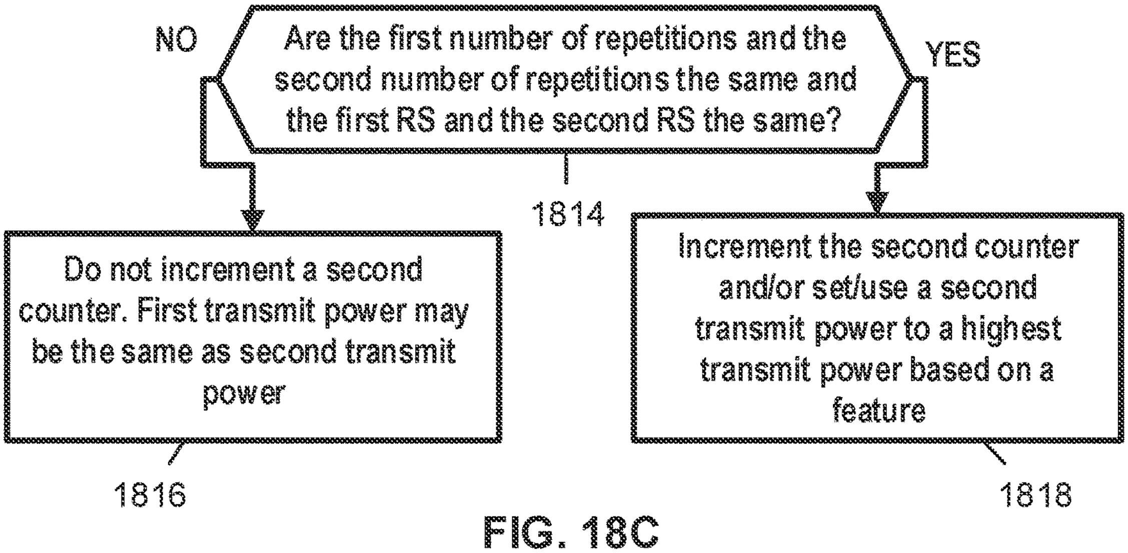
FIG. 18C shows an example method for transmission power determination based on reference signals and a quantity of repetitions.

FIG. 18C shows an example method for transmission power determination based on reference signals and a quantity of repetitions. A first RS and a second RS may, for example in step 1814, be the same. A first quantity/number of repetitions and a second quantity/number of repetitions, for example in step 1814, may be the same. A wireless device may increment the second counter by more than one (e.g., by/to a highest (possible) value, PREAMBLE_POWER_RAMPING_COUNTER_MAX, and the like), based on the first RS being the same as the second RS and the first number of repetitions being the same as the second number of repetitions, in step 1818. The wireless device may set/use the second transmit power to be a highest transmit power (e.g., maximum transmit power, PCmax, maximum output power for the wireless device, $P_{CMAX,f,c}(i)$, maximum output power configured for the wireless device, and the like), based on the first RS being the same as the second RS and the first number of repetitions being the same as the second number of repetitions. The wireless device may set/use the first transmit power to be a highest transmit power (e.g., maximum transmit power, PCmax, maximum output power for the wireless device, $P_{CMAX,f,c}(i)$, maximum output power configured for the wireless device, and the like) for example, based on the feature.

The first RS and the second RS may not be the same (e.g., may be different) and/or the first quantity/number of repetitions and the second quantity/number of repetitions may not be the same (e.g., may be different), in step 1814. A wireless device may not increment (e.g., may maintain) the second counter, in response to the first RS not being the same as (e.g., being different from) the second RS and/or the second number of repetitions and the first number of repetitions not being the same (e.g., being different), in step 1816. The wireless device may transmit the second number of repetitions of the second preamble using a second transmit power. The second transmit power may be the same as the first transmit power, for example, based on maintaining the second counter.

The feature may be indicated in the one or more configuration parameters (e.g., featurePriorities, featureIndicaition, and the like). The feature may be small data transmission (SDT), network slicing, and/or reduced capability (RedCap). The feature may be message 3 repetitions, extended reality (XR), and/or ultra reliable low latency communication (URLLC). The feature may be low latency communication, indicate communication for medical applications (e.g., surgery), and/or sidelink communication. The feature may be integrated access and backhaul (IAB), shared spectrum channel access (e.g., unlicensed cell/band/spectrum/carrier), and/or coverage enhancement (CE). The feature may be IMS voice, a public warning system, and/or emergency services. The feature may be a stand-alone network, dual connectivity, and/or multi-radio connectivity. The feature may be multicast and broadcast services (MBS), sidelink relay, and/or a multi-SIM device. The feature may be interference management, positioning, a non-terrestrial network (NTN), and/or a wireless device being in an NTN.

A wireless device may increment the second counter by more than one (e.g., by/to a highest (possible) value, PREAMBLE_POWER_RAMPING_COUNTER_MAX, and the like) based on the wireless device being in a non-terrestrial network (NTN), based on the first RS being the same as the second RS and the first quantity/number of repetitions being the same as the second quantity/number of repetitions. The wireless device may set/use the second transmit power to be a highest transmit power (e.g., maximum transmit power, PCmax, maximum output power for the wireless device, $P_{CMAX,f,c}(i)$, maximum output power configured for the wireless device, and the like), for example, based on the wireless device being in the NTN, based on the first RS being the same as the second RS and the first number of repetitions being the same as the second number of repetitions. The wireless device may be in an NTN based on receiving one or more (downlink) signals/messages from an NTN payload (e.g., satellite, drone, uncrewed aerial vehicle, high altitude platform station, balloon, NTN payload on an airborne or space-borne NTN vehicle, and the like). The wireless device may be in an NTN based on transmitting one or more (uplink) signals (e.g., Msg1, Msg3, Msg4 HARQ-ACK, Msg5, preamble, PRACH, RACH, PUSCH, PUCCH, SRS, and the like) to the NTN payload. The wireless device may be in an NTN based on the presence of one or more NTN-related parameters (e.g., NTN-specific system information block (SIB), SIB19, SIB31, SIB32, satellite ephemeris, t-service, NTN-config, ntn-UlSync ValidityDuration, ta-common, and the like) in the one or more configuration parameters. The wireless device may be in an NTN based on the one or more configuration parameters indicating that the cell (that is serving the wireless device, or the wireless device is in) is an NTN cell.

The first RS may be the same as the second RS. The first quantity/number of repetitions may, for example, be the same as the second quantity/number of repetitions. A wireless device may not be in an NTN. The wireless device may not increment the second counter by more than one based on the first RS being the same as the second RS and the first number of repetitions being the same as the second number of repetitions, for example, based on the wireless device not being in an NTN. The wireless device may not set/use the second transmit power to be a highest transmit power (e.g., maximum transmit power, PCmax, maximum output power for the wireless device, $P_{CMAX,f,c}(i)$, maximum output power configured for the wireless device, and the like) based on the first RS being the same as the second RS and the first number of repetitions being the same as the second number of repetitions, for example, based on the wireless device not being in an NTN. Setting/using the second transmit power to be a highest transmit power (e.g., maximum transmit power, PCmax, maximum output power for the wireless device, P(MAX (i), maximum output power configured for the wireless device, and the like) may reduce a number of preamble retransmission attempts. Reducing the number of preamble retransmission attempts may be more important in an NTN than in a non-NTN due to the increased distance (e.g., propagation distance, round-trip distance, and the like) and/or time (e.g., propagation time, round-trip time, wireless device-base station RTT, and the like) between the wireless device and a base station (e.g., NTN payload) in an NTN.

A wireless device may be in an NTN. In an example, the first RS and the second RS may be the same. The wireless device may increment the second counter by more than one (e.g., by/to a highest (possible) value, PREAMBLE_POWER_RAMPING_COUNTER_MAX, and the like), for example, based on the wireless device being in the NTN, and the first RS and the second RS being the same (e.g., regardless of the first quantity/number of repetitions and the second quantity/number of repetitions). The wireless device may set/use the second transmit power to be a highest transmit power (e.g., maximum transmit power, PCmax, maximum output power for the wireless device, $P_{CMAX,f,c}(i)$, maximum output power configured for the wireless device, and the like), for example, based on the wireless device being in the NTN and the first RS and the second RS being the same (e.g., regardless of the first number of repetitions and the second number of repetitions). The wireless device may be in an NTN. The wireless device may increment the second counter by more than one (e.g., by/to a highest (possible) value, PREAMBLE_POWER_RAMPING_COUNTER_MAX, and the like), for example, based on the wireless device being in the NTN (e.g., regardless of whether the first RS and the second RS are the same and/or the first number of repetitions and the second number of repetitions are the same).

The second counter may be associated with a quantity/number of repetitions. In an example, a first RS and a second RS may be the same. A first quantity/number of repetitions and a second quantity/number of repetitions may be the same. A wireless device may increment the second counter associated with the first (and/or) second number of repetitions (or a first and/or second level), for example, based on the first RS being the same as the second RS and the first number of repetitions being the same as the second number of repetitions. The wireless device may maintain a third counter, for example, based on the first RS being the same as the second RS and the first number of repetitions being the same as the second number of repetitions. The third counter may be associated with a third number of repetitions (or a third level). The third number of repetitions may not be the same as (e.g., may be different from), for example, the first number of repetitions. The third number of repetitions may not be the same as (e.g., may be different from), for example, the second number of repetitions. The third level may not be the same as (e.g., may be different from), for example, the first level. The third level may not be the same as (e.g., may be different from), for example, the second level. The second counter may be used to count/track a number of transmissions of a preamble with a number of repetitions within/using/in an RS. For example, the second counter may be a preamble transmission counter per CE level and SSB, a preamble transmission counter per CE level and CSI-RS, a preamble transmission counter per number of repetitions and SSB/CSI-RS, and the like.

Figure 19:
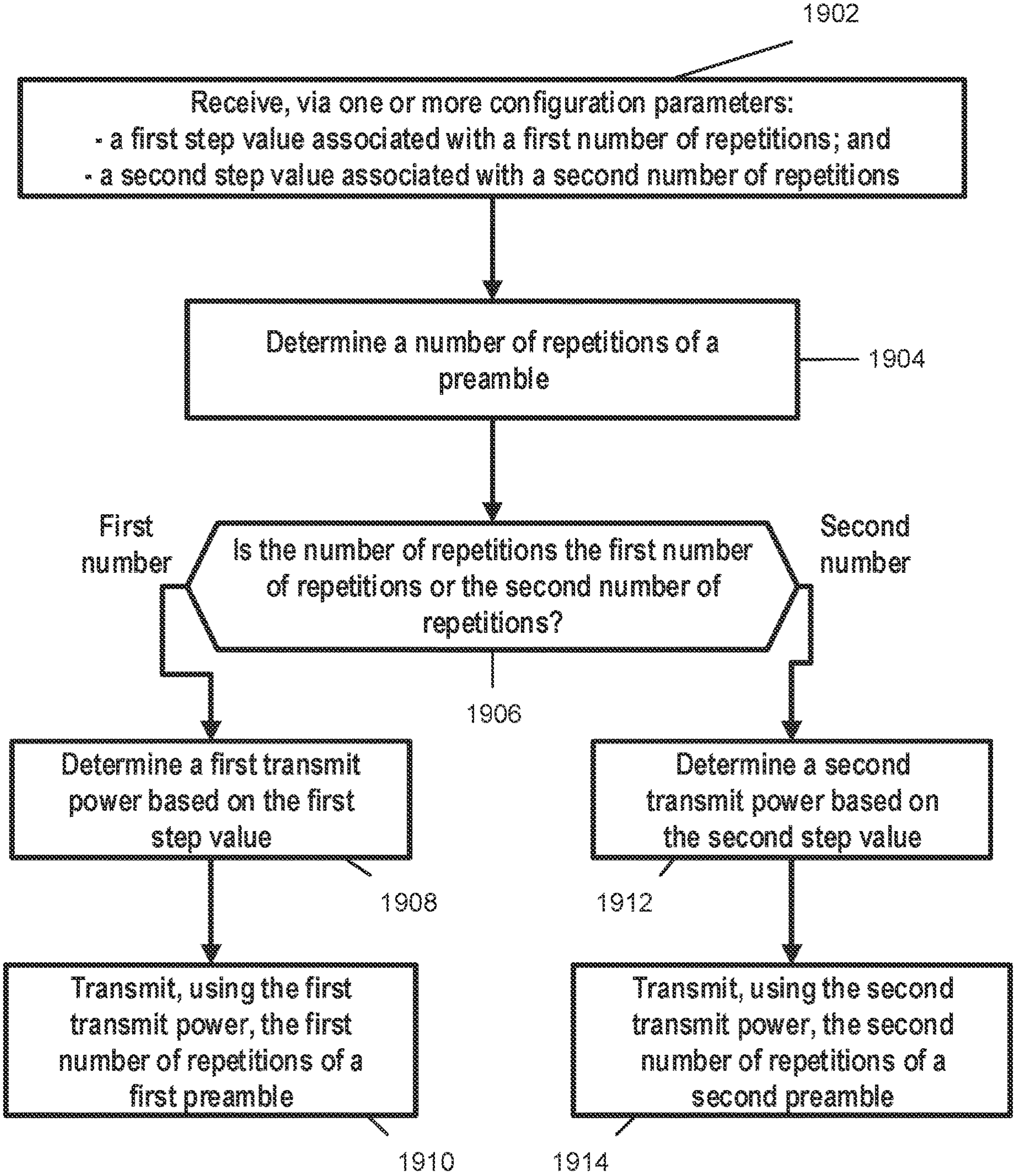
FIG. 19 shows an example method for transmission power determination based on a quantity of repetitions.

FIG. 19 shows an example method for transmission power determination based on a quantity of repetitions. In step 1902, a step value may be associated with a quantity/number of repetitions (or a level). For example, a wireless device may receive one or more configuration parameters from a base station. The one or more configuration parameters may comprise/indicate a first step value associated with a first quantity/number of repetitions (or a first level). The one or more configuration parameters may comprise/indicate a second step value associated with a second quantity/number of repetitions (or a second level).

A wireless device may determine a first quantity/number of repetitions for a first preamble, in step 1904. The wireless device may determine a first transmit power to send (e.g., transmit) the first number of repetitions of the first preamble, for example, based on the first step value, based on the first step value being associated with the first number of repetitions, in step 1906. The wireless device may determine the first transmit power to send (e.g., transmit) the first number of repetitions of the first preamble based on the first step value, based on the first step value being associated with the first number of repetitions, and the feature as in step 1908. The wireless device may send (e.g., transmit), using the first transmit power, the first number of repetitions of the first preamble, in step 1910.

A wireless device may determine a second quantity/number of repetitions for a second preamble. The wireless device may determine a second transmit power to transmit the second number of repetitions of the second preamble, for example, based on the second step value, based on the second step value being associated with the second number of repetitions, in step 1906. The wireless device may determine the second transmit power to send (e.g., transmit) the second number of repetitions of the second preamble based on the second step value, based on the second step value being associated with the second number of repetitions, and the feature as in step 1912. The wireless device may send (e.g., transmit), using the second transmit power, the second number of repetitions of the second preamble, in step 1914.

The first quantity/number of repetitions and the second number of repetitions may not be the same (e.g., may be different, the second number of repetitions may be greater than the first number of repetitions, and the like), in the example of FIG. 19. The first step value and the second step value may not be the same (e.g., may be different). The first step value and the second step value may not be the same, for example, based on the first number of repetitions and the second number of repetitions not being the same. The first transmit power and the second transmit power, for example, may not be the same. The first transmit power and the second transmit power may not be the same, for example, based on the first step size and the second step size not being the same. A preamble (e.g., the first preamble, the second preamble, and the like) may, refer to an uplink signal/message (e.g., PRACH transmission/message, RACH transmission/message, Msg1, Msg3, Msg5, Msg4 HARQ-ACK, PUCCH transmission/message, PUSCH transmission/message).

The random access procedure may be performed for a purpose (e.g., raPurpose). A wireless device may determine (e.g., set, use, configure, and the like) a parameter (e.g., raPurpose) to a value corresponding to the purpose, based on the purpose of the random access procedure. The purpose may be initial access for the wireless device from RRC_IDLE/RRC_INACTIVE mode/state, RRC connection re-establishment, and/or downlink or uplink data arrival, for example, during RRC_CONNECTED and/or RRC_INACTIVE if the uplink synchronization status is "non-synchronized." The purpose may be uplink data arrival if there are no PUCCH resources for SR available to the wireless device, SR failure, and/or a request by an RRC layer of the wireless device upon synchronous reconfiguration (e.g., handover). The purpose may be RRC connection resume procedure from RRC_INACTIVE/RRC_IDLE state/mode, to establish time alignment for a secondary timing advance group, and/or to request for other system information. The purpose may be for beam failure recovery, consistent uplink listen, for example, before talk (LBT) failure on a SpCell, and/or for SDT in RRC_INACTIVE/RRC_IDLE mode/state. The purpose may be for positioning, for example, during RRC_CONNECTED state requiring the random access procedure, e.g., if timing advance is needed for positioning.

The random access procedure may be a 4-step (e.g., type—1) random access procedure. The random access procedure may be a 2-ste (e.g., type—2) random access procedure. The random access procedure may be a contention based random access (CBRA) procedure. A wireless device may select/send (e.g., transmit) a preamble (e.g., the first preamble, the second preamble, and the like) from a set of preambles dedicated to CBRA, for example, based on the random access procedure being a CBRA. The random access procedure may be a contention free random access (CFRA) procedure. The wireless device may select/send (e.g., transmit) a preamble (e.g., the first preamble, the second preamble, and the like) from a set of preambles dedicated to CFRA, for example, based on the random access procedure being a CFRA.

Incrementing the second counter may be the same as increasing a transmit power. A wireless device may set the second counter to a first value. The wireless device may determine a first transmit power based on the second counter (e.g., the first value of the second counter). The wireless device may increment the counter. A value of the second counter, for example, after the wireless device incremented the second counter may be a second value. The second value may be higher than the first value. The wireless device may determine a second transmit power based on the second counter (e.g., the second value of the second counter). The second transmit power may be higher (e.g., greater, stronger, more, larger, and the like) than the first transmit power, for example, based on the second value being higher than the first value.

A wireless device may determine the second transmit power that is higher than the first transmit power without using the second counter. Increasing a transmit power from the first transmit power to the second transmit power using the second counter may be one of several methods of increasing the transmit power. The wireless device may increase the transmit power without incrementing the second counter but by incrementing (e.g., increasing) a step value (e.g., PREAMBLE_POWER_RAMPING_STEP, DELTA_PREAMBLE, POWER_OFFSET_2 STEP_RA, and the like). The wireless device may increase the transmit power without incrementing the second counter but by increasing a target received power (e.g., preambleReceivedTargetPower, PREAMBLE_RECEIVED_TARGET_POWER, and the like). In light of the different methods (e.g., techniques, embodiments, and the like) to increase the transmit power, incrementing the second counter may be the same as increasing (e.g., changing) the transmit power from the first transmit power to the second transmit power, for example, based on incrementing (e.g., increasing) the step value. Incrementing the second counter may be the same as increasing (e.g., changing) the transmit power from the first transmit power to the second transmit power, for example, based on increasing the target received power.

A wireless device may determine (e.g., select, choose, pick, and the like) a first RS for a random access procedure. The wireless device may determine (e.g., calculate, compute, estimate, and the like) a first receiver (RX) beam for receiving a downlink signal from a base station, for example, based on determining the first RS. Determining the first RS may comprise determining the first RX beam. There may be a one-to-one mapping between the first RS and the first RX beam. The wireless device may use the first RX beam to receive one or more downlink signals (e.g., apart from the first RS) from the base station.

A wireless device may determine a first transmit (TX) beam, for example, based on determining the first RS. Determining the first RS may comprise determining the first TX beam. The wireless device may, for example, use beam correspondence without beam sweeping (e.g., beamcorrespondencewithoutULbeamsweeping) capability to determine the first TX beam based on the first RS (or based on determining the first RS). The wireless device may determine the first TX beam based on the first RS (or based on determining the first RS), for example, by using uplink beam sweeping.

A wireless device may determine a second RS for the random access procedure. The wireless device may determine a second RX beam, for example based on the second RS (or based on determining the second RS). The wireless device may determine a second TX beam, for example based on the second RS (or based on determining the second RS).

The first RS may not be the same as (e.g., may be different from) the second RS. The first RX beam may not be the same as (e.g., may be different from) the second RX beam, for example, based on the first RS not being the same as (e.g., being different from) the second RS. The first TX beam may not be the same as (e.g., may be different from) the second TX beam, for example, based on the first RS not being the same as (e.g., being different from) the second RS.

The first RS may be the same as the second RS. The first RX beam may be the same as the second RX beam, for example, based on the first RS being the same as (e.g., being different from) the second RS. The first TX beam may be the same as the second TX beam, for example, based on the first RS being the same as the second RS.

Figure 20:
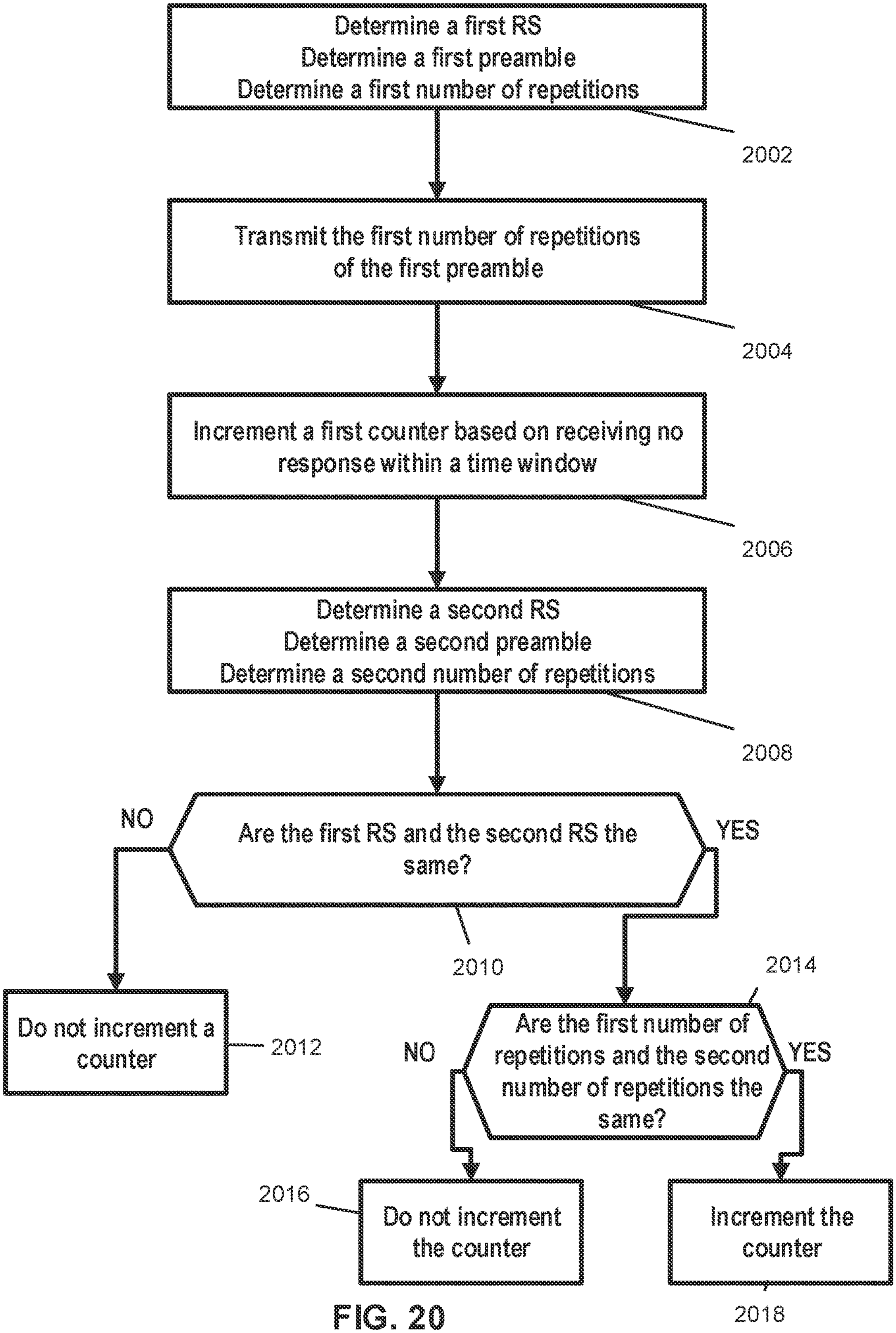
FIG. 20 shows an example method for incrementing a counter based on RS and quantity of repetitions.

FIG. 20 shows an example method for incrementing a counter based on RS and quantity of repetitions. A wireless device may receive one or more configuration parameters from a base station. The one or more configuration parameters may comprise/indicate a first RS. The one or more configuration parameters may comprise/indicate a second RS. The wireless device may determine (e.g., select, choose, pick, and the like) the first RS for a random access procedure, in step 2002. The wireless device may determine (e.g., select, pick, choose, and the like) a first preamble for the random access procedure, in step 2002. The wireless device may determine the first preamble, for example, based on the first RS. The wireless device may determine a first quantity/number of repetitions of the first preamble, in step 2002. The wireless device may determine the first number of repetitions, for example, based on a first radio link quality of the first RS. The wireless device may send (e.g., transmit) the first number of repetitions of the first preamble, in step 2004. The wireless device may start a time window (e.g., ra-Response Window, MsgB-ResponseWindow, and the like), for example, based on sending (e.g., transmitting) the first number of repetitions of the first preamble. The wireless device may, for example, not receive a response from the base station within (e.g., at the expiry of, at the end of, and the like) the time window. The wireless device may consider the random access procedure to be unsuccessful at the end of (e.g., at the expiry of, and the expiry of, and the like) the time window. The wireless device may increment a first counter, based on receiving no response within the time window, in step 2006. The wireless device may determine a second RS for the random access procedure, for example, based on not receiving a response (or based on considering the random access procedure to be unsuccessful) at the end of the time window, in step 2008. The wireless device may determine a second preamble, for example, based on the second RS, in step 2008. The wireless device may determine a second number of repetitions of the second preamble, for example, based on a second radio link quality of the second RS, in step 2008. The wireless device may determine to increment (e.g., whether to increment, whether to maintain, whether to not increment (e.g., maintain), whether to decrement, and the like) a counter (e.g., power ramping counter, preamble power ramping counter, preamble power ramping counter per CE, preamble power ramping counter per number of repetitions, PREAMBLE_POWER_RAMPING_COUNTER, and the like) based on whether the first RS and the second RS are the same and whether the first number of repetitions and the second number of repetitions are the same, in step 2010.

The first RS and the second RS may not be the same (e.g., may be different). A wireless device may not increment (e.g., maintain, keep the same, hold the same, maintain a same value, keep the same value, hold the value, and the like) the counter, for example in step 2012, based on the first RS and the second RS not being the same (e.g., being different). The wireless device may not increment the counter based on the first RS and the second RS not being the same (e.g., being different), for example, regardless of whether the first quantity/number of repetitions and the second quantity/number of repetitions are the same.

The first RS and the second RS may be the same, leading to step 2014. The first quantity/number of repetitions and the second quantity/number of repetitions, for example, may not be the same. A wireless device may not increment the counter, for example, based on the first RS being the same as the second RS and the first number of repetitions not being the same as (e.g., being different from, being higher than, being lower than, and the like) the second number of repetitions, as in step 2016. The wireless device may not increment the counter, for example, based on the first number of repetitions not being the same as (e.g., being different from, being higher than, being lower than, and the like) the second number of repetitions.

The first RS and the second RS may be the same, leading to step 2014. The first quantity/number of repetitions and the second quantity/number of repetitions, for example, may be the same. A wireless device may increment the counter, for example, based on the first RS being the same as the second RS and the first number of repetitions being the same as the second number of repetitions, as in step 2018.

An example method may comprise: selecting, by a wireless device, a first reference signal (RS) for a random-access procedure, wherein a first radio link quality of the first RS indicates a first quantity/number of repetitions; sending (e.g., transmitting) the first quantity/number of repetitions of a first preamble; based on not receiving a random-access response corresponding to the first preamble, selecting a second RS for the random access procedure, wherein a second radio link quality of the second RS indicates a second quantity/number of repetitions; determining to increment a power ramping counter based on whether: the first RS and the second RS are the same; and the first quantity/number of repetitions and the second quantity/number of repetitions are the same; and sending (e.g., transmitting), using a transmission power determined based on the power ramping counter, the second quantity/number of repetitions of a second preamble.

A wireless device may perform a method comprising multiple operations. The wireless device may receive one or more configuration parameters. One or more configuration parameters may indicate a first RS. One or more configuration parameters may indicate a second RS. The first RS may be a first synchronization signal block (SSB). The first RS may be a first channel state information RS (CSI-RS). The second RS may be a second synchronization signal block (SSB). The second RS may be a second channel state information RS (CSI-RS). One or more configuration parameters may indicate one or more thresholds. The first quantity/number of repetitions may be determined based on the one or more thresholds.

The random access response may be a fallbackRAR. The random access response may be a MsgB. The first preamble may be associated with a first preamble index. Not receiving a random access response comprises not receiving a random access response comprising the first preamble index. Not receiving a random access response comprises receiving a random access response not comprising the first preamble index. The wireless device may not receive the random access response within a time window. The time window may be a random access response window. The time window may be a MsgB response window. The wireless device may increment a preamble transmission counter based on not receiving the random access response corresponding to the first preamble.

The wireless device may select a second RS based on the preamble transmission counter being less than a maximum value. The maximum value may be a preamble TransMax plus one. The maximum value may be indicated by the one or more configuration parameters. A first RS index may be associated with the first RS. A second RS index may be associated with second RS. The first RS and the second RS may be the same based on the first RS index and the second RS index being the same.

The wireless device may determine a first level. The first quantity/number of repetitions may be associated with the first level. Determining the first level may be based on one or more thresholds indicated by the one or more configuration parameters. The wireless device may determine a second level. Determining the second level may be based on one or more thresholds indicated by the one or more configuration parameters. The second quantity/number of repetitions may be associated with the second level. The determination may be based on whether the first level and the second level are the same.

The transmission power may be increased based on incrementing the power ramping counter. The transmission power may be maintained based on maintaining the power ramping counter. The transmission power may be maintained based on not incrementing the power ramping counter.

A wireless device may perform a method comprising multiple operations. The wireless device may send (e.g., transmit) a first quantity of repetitions of a first preamble associated with a random access (RA) procedure, wherein the first quantity is indicated by a first reference signal (RS). Based on a determination that a random access response (RAR) has not been received for the RA procedure, the wireless device may determine a second quantity of repetitions of a second preamble, wherein the second quantity may be indicated by a second RS. The wireless device may send (e.g., transmit) the second quantity of repetitions of the second preamble using a transmission power that is based on a value of a power ramping counter, wherein the value may be based on the first RS and the second RS being the same, and/or the first quantity of repetitions and the second quantity of repetitions being the same. The wireless device may determine, based on a radio link quality of the first RS the first quantity of repetitions. The wireless device may determine, based on a radio link quality of the second RS, the second quantity of repetitions. The wireless device may increase the transmission power for sending (e.g., transmitting) the second quantity of repetitions, based on the second quantity of repetitions being the same as a predetermined quantity of repetitions. The transmission power may be determined based on incrementing the power ramping counter to a value. The power ramping counter may be incremented in one or more of the following ways: incremented by one, incremented by more than one, and/or incremented by a highest value. At least one of the first quantity of repetitions and the second quantity of repetitions may be associated with one or more of a repetition level, a coverage level, and/or a coverage enhancement (CE) level. The first quantity of repetitions and the second quantity of repetitions may be associated with one or more thresholds. The wireless device may comprise one or more processors and memory, storing instructions, that when executed by the one or more processors perform the method described herein. A system may comprise the wireless device configured to perform the described method, additional operations, and/or include the additional elements; and a base station configured to receive at least one of the second quantity of repetitions. A computer-readable medium may store instructions that, when executed, cause performance of the described method, additional operations, and/or include additional elements. A base station may perform a corresponding method comprising multiple operations. The base station may perform a corresponding method, for example, by transmitting the downlink control message.

A wireless device may perform a method comprising multiple operations. The wireless device may send (e.g., transmit) a first quantity of repetitions of a first preamble associated with a random access (RA) procedure, wherein the first quantity is indicated by a first reference signal (RS). The wireless device may determine a second quantity of repetitions of a second preamble, wherein the second quantity is indicated by a second RS. The wireless device may determine that the first RS and the second RS are the same. The wireless device may send (e.g., transmit) the second quantity of repetitions of the second preamble using a transmission power. The transmission power may be based on a value of a power ramping counter, wherein the value may be based on the first quantity of repetitions and the second quantity of repetitions being the same. The wireless device may determine, based on a radio link quality of the first RS, the first quantity of repetitions. The wireless device may determine, based on a radio link quality of the second RS, the second quantity of repetitions. The transmission power may be determined based on incrementing the power ramping counter to a value. The power ramping counter may be incremented in one or more of the following ways: incremented by one, incremented by more than one, and/or incremented by a highest value. At least one of the first quantity of repetitions and the second quantity of repetitions may be associated with one or more of a repetition level, a coverage level, and/or a coverage enhancement (CE) level. The first quantity of repetitions and the second quantity of repetitions may be associated with one or more thresholds. The wireless device may comprise one or more processors and memory, storing instructions, that when executed by the one or more processors perform the method described herein. A system may comprise the wireless device configured to perform the described method, additional operations, and/or include the additional elements; and a base station configured to receive at least one of the second quantity of repetitions. A computer-readable medium may store instructions that, when executed, cause performance of the described method, additional operations, and/or include additional elements. A base station may perform a corresponding method comprising multiple operations. The base station may perform a corresponding method, for example, by transmitting the downlink control message.

A wireless device may perform a method comprising multiple operations. The wireless device may determine, a first quantity of repetitions of a first preamble associated with a random access (RA) procedure, based on a radio link quality of a first reference signal (RS). The wireless device may send (e.g., transmit) the first quantity of repetitions of the first preamble. The wireless device may determine, a second quantity of repetitions of a second preamble, based on a radio link quality of a second RS. The wireless device may increment a power ramping counter, based on the first quantity of repetitions and the second quantity of repetitions being the same. Incrementing the power ramping counter may be based on the first RS and the second RS being the same. The wireless device may send (e.g., transmit) the second quantity of repetitions of the second preamble using a transmission power that is based on the power ramping counter. Sending (e.g., transmitting) the first quantity of repetitions of the first preamble may comprise sending (e.g., transmitting) the first quantity of repetitions using an initial transmission power. The transmission power used for transmission of the second quantity of repetitions may be greater than the initial transmission power by an amount indicated by the power ramping counter. Incrementing the power ramping counter may be based on one or more of the following features, small data transmission (SDT), reduced capability (RedCap), and/or extended reality (XR). Incrementing the power ramping counter comprises one or more of, incrementing the power ramping counter by one, incrementing the power ramping counter by more than one, and/or incrementing the power ramping counter by a highest value. At least one of the first quantity of repetitions and the second quantity of repetitions is associated with one or more of the following, a repetition level, a coverage level, and/or a coverage enhancement (CE) level. The first quantity of repetitions and the second quantity of repetitions may be associated with one or more thresholds. The wireless device may determine the second quantity of repetitions, based on a determination that a random access response (RAR) has not been received for the RA procedure. The wireless device may comprise one or more processors and memory, storing instructions, that when executed by the one or more processors perform the method described herein. A system may comprise the wireless device configured to perform the described method, additional operations, and/or include the additional elements; and a base station configured to receive at least one of the second quantity of repetitions. A computer-readable medium may store instructions that, when executed, cause performance of the described method, additional operations, and/or include additional elements. A base station may perform a corresponding method comprising multiple operations. The base station may perform a corresponding method, for example, by transmitting the downlink control message.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, 6G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, 6G, or other 3GPP or non-3GPP technology.

One or more parameters, fields, and/or Information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, Wi-Fi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described herein, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:

transmitting, by a wireless device, a first quantity of repetitions of a first preamble associated with a random access (RA) procedure, wherein the first quantity is indicated by a first reference signal (RS);

based on a determination that a random access response (RAR) has not been received for the RA procedure, determining a second quantity of repetitions of a second preamble, wherein the second quantity is indicated by a second RS; and transmitting the second quantity of repetitions of the second preamble using a transmission power that is based on a value of a power ramping counter, wherein the value is based on the first quantity of repetitions and the second quantity of repetitions being the same.

2. The method of claim 1, further comprising:

determining, based on a radio link quality of the first RS, the first quantity of repetitions; and determining, based on a radio link quality of the second RS, the second quantity of repetitions.

3. The method of claim 1, further comprising:

increasing the transmission power for transmitting the second quantity of repetitions, based on the second quantity of repetitions being the same as a predetermined quantity of repetitions.

4. The method of claim 1, further comprising determining the transmission power based on incrementing the power ramping counter to the value, wherein the power ramping counter is incremented in one or more of the following ways:

incremented by one;

incremented by more than one; or incremented by a highest value.

5. The method of claim 1, wherein at least one of the first quantity of repetitions and the second quantity of repetitions is associated with one or more of:

a repetition level;

a coverage level; or a coverage enhancement (CE) level.

6. The method of claim 1, wherein the first quantity of repetitions and the second quantity of repetitions are associated with one or more thresholds.

7. The method of claim 1, wherein the value is further based on the first RS and the second RS being the same.

8. A method comprising:

transmitting, by a wireless device, a first quantity of repetitions of a first preamble associated with a random access (RA) procedure, wherein the first quantity is indicated by a first reference signal (RS);

determining a second quantity of repetitions of a second preamble, wherein the second quantity is indicated by a second RS;

determining that the first RS and the second RS are the same; and transmitting the second quantity of repetitions of the second preamble using a transmission power, wherein the transmission power is based on a value of a power ramping counter, wherein the value is based on the first quantity of repetitions and the second quantity of repetitions being the same.

9. The method of claim 8, further comprising:

determining, based on a radio link quality of the first RS, the first quantity of repetitions; and determining, based on a radio link quality of the second RS, the second quantity of repetitions.

10. The method of claim 8, further comprising determining the transmission power based on incrementing the power ramping counter to the value, wherein the power ramping counter is incremented in one or more of the following ways:

incremented by one;

incremented by more than one; or incremented by a highest value.

11. The method of claim 8, wherein at least one of the first quantity of repetitions and the second quantity of repetitions is associated with one or more of:

a repetition level;

a coverage level; or a coverage enhancement (CE) level.

12. The method of claim 8, wherein the first quantity of repetitions and the second quantity of repetitions are associated with one or more thresholds.

13. A method comprising:

determining, by a wireless device, based on a radio link quality of a first reference signal (RS), a first quantity of repetitions of a first preamble associated with a random access (RA) procedure;

transmitting the first quantity of repetitions of the first preamble;

determining, based on a radio link quality of a second RS, a second quantity of repetitions of a second preamble; and based on the first quantity of repetitions and the second quantity of repetitions being the same, incrementing a power ramping counter.

14. The method of claim 13, wherein the incrementing the power ramping counter is further based on the first RS and the second RS being the same.

15. The method of claim 13, further comprising:

transmitting the second quantity of repetitions of the second preamble using a transmission power that is based on the power ramping counter.

16. The method of claim 13, wherein the transmitting the first quantity of repetitions of the first preamble comprises transmitting the first quantity using an initial transmission power; and wherein a transmission power used for transmission of the second quantity of repetitions is greater than the initial transmission power by an amount indicated by the power ramping counter.

17. The method of claim 13, wherein the incrementing the power ramping counter is further based on one or more of the following features:

small data transmission (SDT);

reduced capability (RedCap); or extended reality (XR).

18. The method of claim 13, wherein the incrementing the power ramping counter comprises one or more of:

incrementing the power ramping counter by one;

incrementing the power ramping counter by more than one; or incrementing the power ramping counter by a highest value.

19. The method of claim 13, wherein at least one of the first quantity of repetitions and the second quantity of repetitions is associated with one or more of:

a repetition level;

a coverage level; or a coverage enhancement (CE) level.

20. The method of claim 13, wherein the first quantity of repetitions and the second quantity of repetitions are associated with one or more thresholds.

21. The method of claim 13, wherein the determining the second quantity of repetitions is further based on a determination that a random access response (RAR) has not been received for the RA procedure.

* * * * *